US006416864B1

(12) United States Patent
Hayashi et al.

(10) Patent No.: US 6,416,864 B1
(45) Date of Patent: Jul. 9, 2002

(54) BLACK MAGNETIC COMPOSITE PARTICLES FOR A BLACK MAGNETIC TONER

(75) Inventors: Kazuyuki Hayashi; Hiroko Morii, both of Hiroshima; Yasuyuki Tanaka, Onoda; Seiji Ishitani, Hiroshima, all of (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/541,725

(22) Filed: Apr. 3, 2000

Related U.S. Application Data

(63) Continuation-in-part of application No. 09/248,283, filed on Feb. 11, 1999, now abandoned.

(30) Foreign Application Priority Data

Feb. 17, 1998 (JP) ............................................ 10-52826

(51) Int. Cl.[7] ................................................ B32B 5/16

(52) U.S. Cl. ................................ 428/403; 428/694 BA; 428/407; 428/900

(58) Field of Search .......................... 428/403, 694 BA, 428/900, 407

(56) References Cited

U.S. PATENT DOCUMENTS 4,620,987 A 11/1986 Yamashita et al.
4,937,157 A 6/1990 Haack et al.
5,364,720 A 11/1994 Nakazawa et al.
5,599,627 A * 2/1997 Aoki et al. ................. 428/403
5,648,170 A * 7/1997 Okano et al. ............... 428/403
5,922,464 A * 7/1999 Hayashi et al. ............. 428/403
6,294,242 B1 * 9/2001 Hayashi et al. ............. 428/141

FOREIGN PATENT DOCUMENTS

EP 0373426 A2 6/1990
EP 0439367 A2 7/1991
EP 0913431 A2 5/1999

* cited by examiner

*Primary Examiner*—Hoa T. Le
(74) *Attorney, Agent, or Firm*—Nixon & Vanderhye P.C.

(57) ABSTRACT

Black magnetic toner comprising:

a binder resin, and black magnetic composite particles comprising:

magnetic iron oxide particles having an average particle diameter of 0.055 to 0.95 $\mu$m;

a coating layer formed on the surface of said magnetic iron oxide particles, comprising at least one organosilicon compound selected from the group consisting of:

(1) organosilane compounds obtainable from alkoxysilane compounds, (2) polysiloxanes or modified polysiloxanes, and (3) fluoroalkyl organosilane compounds obtainable from fluoroalkylsilane compounds; and a carbon black coat formed on said coating layer comprising said organosilicon compound, in an amount of 1 to 25 parts by weight based on 100 parts by weight of said magnetic iron oxide particles.

Such a black magnetic toner can be free from being deteriorated in electric resistance due to the existence of the carbon black coat, and as a result, is suitable as a high-resistance or insulated magnetic toner.

16 Claims, 2 Drawing Sheets

(×20000)

(×20000)

(×20000)

(×20000)

(×20000)

BLACK MAGNETIC COMPOSITE PARTICLES FOR A BLACK MAGNETIC TONER

CROSS REFERENCE TO RELATED APPLICATION

This is a continuation-in-part of application, Ser. No. 09/248,283 filed Feb. 11, 1999, now abandoned.

BACKGROUND OF THE INVENTION

The present invention relates to a black magnetic toner, and more particularly, to black a black magnetic toner using magnetic composite particles, which is not only excellent in fluidity and blackness, but also small in reduction of electric resistance and, therefore, can realize a high image quality and a high copying speed, and black magnetic composite particles which not only show an excellent dispersibility in a binder resin due to less amount of carbon black fallen-off from the surface of each particle, but also have an excellent fluidity and blackness.

As one of conventional electrostatic latent image-developing methods, there has been widely known and generally adopted a so-called one component system development method of using as a developer, a magnetic toner comprising composite particles prepared by mixing and dispersing magnetic particles such as magnetite particles in a resin, without using a carrier.

The conventional development methods of using one-component magnetic toner have been classified into CPC development methods of using a low-resistance magnetic toner, and PPC development methods of using a high-resistance magnetic toner.

In the CPC methods, the low-resistance magnetic toner used therefor has an electric conductivity, and is charged by the electrostatic induction due to electric charge of the latent images. However, since the charge induced on the magnetic toner is lost while the magnetic toner is transported from a developing zone to a transfer zone, the low-resistance magnetic toner is unsuitable for the PPC development method of using an electrostatic transfer method. In order to solve this problem, there have been developed the insulated or high resistance magnetic toners having a volume resistivity as high as not less than $10^{14}$ Ω·cm.

As to the insulated or high-resistance magnetic toner, it is known that the developing characteristics thereof are affected by magnetic particles exposed to the surface of the magnetic toner, or the like.

Recently, with the high image quality such as high image density or high tone gradation, or with the high copying speed of duplicating machines, it has been strongly demanded to further enhance characteristics of the insulted or high-resistance magnetic toners as a developer, especially a fluidity thereof.

With respect to such demands, in Japanese Patent Application Laid-Open (KOKAI) No. 53-94932(1978), there has been described "these high-resistance magnetic toners are deteriorated in fluidity due to the high electric resistance, so that there arises such a problem that non-uniformity of developed images tend to be caused. Namely, although the high-resistance magnetic toners for PPC development method can maintain necessary charges required for image transfer, the magnetic toners are frictionally charged even when they are present in other steps than the transfer step, where the magnetic toners are not required to be charged, e.g., in a toner bottle or on the surface of a magnetic roll, or also slightly charged by mechano-electrets during the production process of these magnetic toners. Therefore, the magnetic toners tend to be electrostatically agglomerated, resulting in deterioration of fluidity thereof", and "It is an another object of the present invention to provide a high-resistance magnetic toner for PPC development method which is improved in fluidity, can be prevented from causing non-uniformity of developed images, and has an excellent image definition and tone gradation, thereby obtaining high-quality copies by indirect copying methods".

In recent years, with the reduction in particle size of the insulated or high-resistance magnetic toners, it has been increasingly required to enhance the fluidity thereof.

With respect to such a fact, in "Comprehensive Data Collection for Development and Utilization of Toner Materials" published by Japan Scientific Information Co., Ltd., page 121, there has been described "With extensive development of printers such as ICP, a high image quality has been required. In particular, it has been demanded to develop high-precision or high-definition printers. In Table 1, there is shown a relationship between definitions obtained by using the respective toners. As is apparent from Table 1, the smaller the particle size of wet toners, the higher the image definition is obtained. Therefore, when a dry toner is used, in order to enhance the image definition, it is also required to reduce the particle size of the toner . . . As reports of using toners having a small particle size, it has been proposed that by using toners having a particle size of 8.5 to 11 μm, fogs on a background can be improved and toner consumption can be reduced, and further by using polyester-based toners having a particle size of 6 to 10 μm, an image quality, a charging stability and lifetime of the developer can be improved. However, when such toners having a small particle size are used, it has been required to solve many problems. There are problems such as improvement in productivity, sharpness of particle size distribution, improvement in fluidity, etc.".

Further, black magnetic toners widely used at the present time, have been required to show a high degree of blackness and a high image density for line images and solid area images on copies.

With respect to this fact, on page 272 of the above-mentioned "Comprehensive Data Collection for Development and Utilization of Toner Materials", there has been described "Powder development is characterized by a high image density. However, the high image density as well as the fog density as described hereinafter, greatly influences image characteristics obtained".

There is a close relationship between properties of the magnetic toner and those of the magnetic particles mixed and dispersed in the magnetic toner.

That is, the fluidity of the magnetic toner is largely varied depending upon surface condition of the magnetic particles exposed to the surface of the magnetic toner. Therefore, the magnetic particles themselves have been strongly required to show an excellent fluidity.

The degree of blackness and density of the magnetic toner are also largely varied depending upon the degree of blackness and density of the magnetic particles as a black pigment contained in the magnetic toner.

As the black pigment, magnetite particles have been widely used from the standpoints of magnetic properties such as saturation magnetization or coercive force, low price, color tone or the like. In addition to the magnetite particles, carbon black fine particles may be added. However, in the case where the carbon black fine particles are used in a large amount, the electric resistance is lowered, so that it is not possible to obtain an insulated or high-resistance magnetic toner.

Hitherto, in order to enhance the fluidity of the black magnetic toner, there have been many attempts of improving the fluidity of the magnetite particles mixed and dispersed in the magnetic toner. For example, there have been proposed (1) a method of forming spherical-shaped magnetite particles (Japanese Patent Application Laid-Open (KOKAI) No. 59-64852(1984)), (2) a method of exposing a silicon compound to the surface of magnetite particles (Japanese Patent Publication (KOKOKU) No. 8-25747(1996)), or the like.

Black magnetic particles for black magnetic toner, which have not only an excellent fluidity and blackness, but also an excellent dispersibility in a binder resin, are presently strongly demanded. However, black magnetic particles capable of satisfying all of these requirements have not been obtained yet.

Namely, the above-mentioned spherical magnetite particles show a higher fluidity than those of cubic magnetite particles, octahedral magnetite particles or the like. However, the fluidity of the spherical magnetite particles is still insufficient, and further the blackness is disadvantageously low.

As to the above-mentioned magnetite particles to the surface of which the silicon compound is exposed, the fluidity thereof is also still insufficient, and the blackness thereof is also disadvantageously low.

As a result of the present inventor's earnest studies for solving the above problems, it has been found that by using as a black magnetic toner, black magnetic composite particles obtained by forming a coating layer composed of at least one organosilicon compound selected from the group consisting of (1) organosilane compounds obtainable from alkoxysilane compounds, (2) polysiloxanes or modified polysiloxanes and (3) fluoroalkyl organosilane compounds obtainable from fluoroalkylsilane compounds, on the surface of magnetic iron oxide particles having an average particle size of 0.055 to 0.95 μm, and forming a carbon black coat on the formed coating layer such that the amount of the carbon black is 1 to 25 parts by weight based on 100 parts by weight of the said magnetic iron oxide particles, the black magnetic toner can have not only an excellent fluidity and an excellent blackness, but also can show a high-resistance or an insulating property without lowering in the electric resistance. The present invention has been attained on the basis of the finding.

SUMMARY OF THE INVENTION

It is an object of the present invention to provide a black magnetic toner, which is not only excellent in fluidity and blackness, but also small in reduction of electric resistance and, therefore, can realize a high image quality and a high copying speed.

It is another object of the present invention to provide black magnetic particles for black magnetic toner, which are not only excellent in fluidity and blackness, but also can show an excellent dispersibility in a binder resin.

To accomplish the aims, in a first aspect of the present invention, there is provided a black magnetic toner comprising: a binder resin, and black magnetic composite particles comprising:

magnetic iron oxide particles having an average particle diameter of 0.055 to 0.95 μm;

a coating layer formed on the surface of the said magnetic iron oxide particles, comprising at least one organosilicon compound selected from the group consisting of:

(1) organosilane compounds obtainable from alkoxysilane compounds, (2) polysiloxanes or modified polysiloxanes, and (3) fluoroalkyl organosilane compounds obtainable from fluoroalkylsilane compounds; and a carbon black coat formed on the said coating layer comprising the said organosilicon compound, in an amount of 1 to 25 parts by weight based on 100 parts by weight of the said magnetic iron oxide particles.

In a second aspect of the present invention, there is provided a black magnetic toner comprising: a binder resin, and black magnetic composite particles comprising:

magnetic iron oxide particles having an average particle diameter of 0.055 to 0.95 μm;

a coat formed on at least a part of the surface of the magnetic iron oxide particles, comprising at least one compound selected from the group consisting of hydroxides of aluminum, oxides of aluminum, hydroxides of silicon and oxides of silicon in an amount of 0.01 to 50% by weight, calculated as Al or $SiO_2$, based on the total weight of the magnetic iron oxide particles;

a coating layer formed on the coat on the surface of the said magnetic iron oxide particles, comprising at least one organosilicon compound selected from the group consisting of:

(1) organosilane compounds obtainable from alkoxysilane compounds, (2) polysiloxanes or modified polysiloxanes, and (3) fluoroalkyl organosilane compounds obtainable from fluoroalkylsilane compounds; and a carbon black coat formed on the said coating layer comprising the said organosilicon compound, in an amount of 1 to 25 parts by weight based on 100 parts by weight of the said magnetic iron oxide particles.

In a third aspect of the present invention, there are provided black magnetic composite particles comprising:

magnetic iron oxide particles having an average particle diameter of 0.055 to 0.95 μm;

a coating layer formed on the surface of the said magnetic iron oxide particles, comprising at least one organosilicon compound selected from the group consisting of:

(1) organosilane compounds obtainable from alkoxysilane compounds, (2) polysiloxanes or modified polysiloxanes, and (3) fluoroalkyl organosilane compounds obtainable from fluoroalkylsilane compounds; and a carbon black coat formed on the said coating layer comprising the said organosilicon compound, in an amount of 1 to 25 parts by weight based on 100 parts by weight of the said magnetic iron oxide particles.

In a fourth aspect of the present invention, there are provided black magnetic composite particles comprising:

magnetic iron oxide particles having an average particle diameter of 0.055 to 0.95 μm;

a coat formed on at least a part of the surface of the magnetic iron oxide particles, comprising at least one compound selected from the group consisting of hydroxides of aluminum, oxides of aluminum, hydroxides of silicon and oxides of silicon in an amount of 0.01 to 50% by weight, calculated as Al or $SiO_2$, based on the total weight of the magnetic iron oxide particles;

a coating formed on the coat of the surface of the said magnetic iron oxide particles, comprising at least one organosilicon compound selected from the group consisting of:

(1) organosilane compounds obtainable from alkoxysilane compounds, (2) polysiloxanes or modified polysiloxanes, and (3) fluoroalkyl organosilane compounds obtainable from fluoroalkylsilane compounds; and a carbon black coat formed on the said coating layer comprising the said organosilicon compound, in an amount of 1 to 25 parts by weight based on 100 parts by weight of the said magnetic iron oxide particles.

In a fifth aspect of the present invention, there are provided black magnetic composite particles comprising:

maghemite particles having an average particle diameter of 0.055 to 0.95 μm;

a coating layer formed on the surface of the said maghemite particles, comprising at least one organosilicon compound selected from the group consisting of:

(1) organosilane compounds obtainable from alkoxysilane compounds, (2) polysiloxanes or modified polysiloxanes, and (3) fluoroalkyl organosilane compounds obtainable from fluoroalkylsilane compounds; and a carbon black coat formed on the said coating layer comprising the said organosilicon compound, in an amount of 1 to 25 parts by weight based on 100 parts by weight of the said maghemite particles.

In a sixth aspect of the present invention, there are provided black magnetic composite particles comprising:

maghemite particles having an average particle diameter of 0.055 to 0.95 μm;

a coat formed on at least a part of the surface of the maghemite particles, comprising at least one compound selected from the group consisting of hydroxides of aluminum, oxides of aluminum, hydroxides of silicon and oxides of silicon in an amount of 0.01 to 50% by weight, calculated as Al or $SiO_2$, based on the total weight of the maghemite particles;

a coating formed on the coat of the surface of the said maghemite particles, comprising at least one organosilicon compound selected from the group consisting of:

(1) organosilane compounds obtainable from alkoxysilane compounds, (2) polysiloxanes or modified polysiloxanes, and (3) fluoroalkyl organosilane compounds obtainable from fluoroalkylsilane compounds; and a carbon black coat formed on the said coating layer comprising the said organosilicon compound, in an amount of 1 to 25 parts by weight based on 100 parts by weight of the said maghemite particles.

In a seventh aspect of the present invention, there is provided a method of mixing a binder resin with black magnetic composite particles for production of a black magnetic toner, which black magnetic composite particles comprise:

magnetic iron oxide particles having an average particle diameter of 0.055 to 0.95 μm;

a coating formed on the surface of the said magnetic iron oxide particles, comprising at least one organosilicon compound selected from the group consisting of:

(1) organosilane compounds obtainable from alkoxysilane compounds, (2) polysiloxanes or modified polysiloxanes, and (3) fluoroalkyl organosilane compounds obtainable from fluoroalkylsilane compounds; and a carbon black coat formed on the said coating layer comprising the said organosilicon compound, in an amount of 1 to 25 parts by weight based on 100 parts by weight of the said magnetic iron oxide particles.

DETAILED DESCRIPTION OF THE INVENTION

Figure 1:
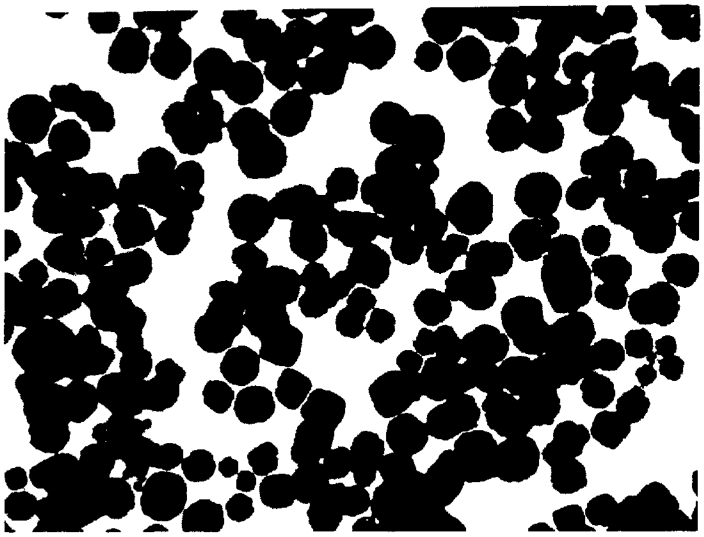
FIG. 1 is an electron micrograph (×20,000) showing a particle structure of spherical magnetite particles used in Example 1.

The present invention is now described in detail below.

First, the black magnetic composite particles used for the black magnetic toner according to the present invention are described.

The black magnetic composite particles according to the present invention, comprise magnetic iron oxide particles as core particles having an average particle diameter of 0.055 to 095 μm, a coating comprising an organosilicon compound which is formed on the surface of each magnetic iron oxide particle, and a carbon black coat formed on the coating layer comprising the organosilicon compound.

As the magnetic iron oxide particles used as core particles in the present invention, there may be exemplified magnetite particles ($\underline{FeO}_x.Fe_2O_3$; $0<X\leqq 1$), maghemite particles ($\gamma$-$Fe_2O_3$) or a mixture of these particles.

As the magnetic iron oxide particles as core particles, from the viewpoint of a particle shape thereof, there may be exemplified isotropic particles having a ratio of an average particle length (average major diameter) to an average particle breadth (average minor diameter) of usually not less than 1.0 and less than 2.0, preferably 1.0 to 1.8, more preferably 1.0 to 1.5, such as spherical particles, granular particles or polyhedral particles, e.g., hexahedral particles or octahedral particles, or anisotropic particles having an aspect ratio (average major axial diameter/average minor axial diameter; hereinafter referred to merely as "aspect ratio") of not less than 2:1, such as acicular particles, spindle-shaped particles or rice ball-shaped particles. In the consideration of the fluidity of the obtained black magnetic composite particles, the magnetic iron oxide particles having an isotropic shape are preferred. Among them, the spherical particles are more preferred.

In the case of the isotropic magnetic iron oxide particles, the average particle size (diameter) thereof is 0.055 to 0.95 μm, preferably 0.065 to 0.75 μm, more preferably 0.065 to 0.45 μm. In the case of the anisotropic magnetic iron oxide particles, the average major axial diameter thereof is 0.055 to 0.95 μm, preferably 0.065 to 0.75 μm, more preferably 0.065 to 0.45 μm, and the aspect ratio (average major axial diameter/average minor axial diameter) thereof is 2:1 to 20:1, preferably 2:1 to 15:1, more preferably 2:1 to 10:1.

When the average particle size of the magnetic iron oxide particles is more than 0.95 μm, the obtained black magnetic composite particles are coarse particles and are deteriorated in tinting strength. On the other hand, when the average particle size is less than 0.055 μm, the intermolecular force between the particles is increased due to the reduction in particle size (fine particle), so that agglomeration of the particles tends to be caused. As a result, it becomes difficult to uniformly coat the surfaces of the magnetic iron oxide particles with the organosilicon compounds, and uniformly form the carbon black coat on the surface of the coating layer comprising the organosilicon compounds.

Further, in the case where the upper limit of the aspect ratio of the anisotropic magnetic iron oxide particles exceeds 20:1, the particles tend to be entangled with each other, and it also becomes difficult to uniformly coat the surfaces of the magnetic iron oxide particles with the organosilicon compounds, and uniformly form the carbon black coat on the surface of the coating layer composed of the organosilicon compounds.

As to the particle size distribution of the magnetic iron oxide particles, the geometrical standard deviation value thereof is preferably not more than 2.0, more preferably not more than 1.8, still more preferably not more than 1.6. When the geometrical standard deviation value thereof is more than 2.0, coarse particles are contained therein, so that the particles are inhibited from being uniformly dispersed. As a result, it also becomes difficult to uniformly coat the surfaces of the magnetic iron oxide particles with the organosilicon compounds, and uniformly form the carbon black coat on the surface of the coating layer composed of the organosilicon compounds. The lower limit of the geometrical standard deviation value is 1.01. It is industrially difficult to obtain particles having a geometrical standard deviation value of less than 1.01.

The BET specific surface area of the magnetic iron oxide particles thereof is not less than 0.5 $m^2/g$. When the BET specific surface area is less than 0.5 $m^2/g$, the magnetic iron oxide particles may become coarse particles, or the sintering between the particles may be caused, so that the obtained black magnetic composite particles also may become coarse particles and tend to be deteriorated in tinting strength. In the consideration of the tinting strength of the obtained black magnetic composite particles, the BET specific surface area of the magnetic iron oxide particles is preferably not less than 1.0 $m^2/g$, more preferably 3.0 $m^2/g$. Further, in the consideration of uniformly coating the surfaces of the magnetic iron oxide particles with the organosilicon compounds, and uniformly forming the carbon black coat on the coating layer composed of the organosilicon compounds, the upper limit of the BET specific surface area of the magnetic iron oxide particles, is usually 70 $m^2/g$, preferably 50 $m^2/g$, more preferably 20 $m^2/g$.

As to the fluidity of the magnetic iron oxide particles, the fluidity index thereof is about 25 to about 44. Among the magnetic iron oxide particles having various shapes, the spherical particles are excellent in fluidity, for example, the fluidity index thereof is about 30 to about 44.

As to the blackness of the magnetic iron oxide particles, in the case of the magnetite particles, the lower limit thereof is usually 18.0 when represented by L* value, and the upper limit thereof is usually 25.0, preferably 24.0 when represented by L* value. In the case of maghemite particles, the lower limit thereof is usually more than 18.0 when represented by L* value, and the upper limit thereof is usually 32, preferably 30 when represented by L* value. When the L* value exceeds the above-mentioned upper limit, the lightness of the particles is increased, so that it is difficult to obtain black magnetic composite particles having a sufficient blackness.

As to the magnetic properties of the magnetic iron oxide particles, the coercive force value thereof is usually about 10 to about 350 Oe, preferably 20 to about 330 Oe; the saturation magnetization value in a magnetic field of 10 kOe is usually about 50 to about 91 emu/g, preferably about 60 to about 90 emu/g; and the residual magnetization value in a magnetic field of 10 kOe is usually about 1 to about 35 emu/g, preferably about 3 to about 30 emu/g.

The particle shape and particle size of the black magnetic composite particles according to the present invention are considerably varied depending upon those of the magnetic iron oxide particles as core particles. The black magnetic composite particles have a similar particle shape to that of the magnetic iron oxide particle as core particle, and a slightly larger particle size than that of the magnetic iron oxide particles as core particles.

More specifically, when the isotropic magnetic iron oxide particles are used as core particles, the obtained black magnetic composite particles according to the present invention, have an average particle size of usually 0.06 to 1.0 μm, preferably 0.07 to 0.8 μm, more preferably 0.07 to 0.5 μm and a ratio of an average particle length to an average particle breadth of usually not less than 1.0 and less than 2.0, preferably 1.0 to 1.8, more preferably 1.0 to 1.5,. When the anisotropic magnetic iron oxide particles are used as core particles, the obtained black magnetic composite particles according to the present invention, have an average particle size of usually 0.06 to 1.0 μm, preferably 0.07 to 0.8 μm, more preferably 0.07 to 0.5 μm.

When the average particle size of the black magnetic composite particles is more than 1.0 μm, the obtained black magnetic composite particles may be coarse particles, and deteriorated in tinting strength. On the other hand, when the average particle size thereof is less than 0.06 μm, the black magnetic composite particles tends to be agglomerated by the increase of intermolecular force due to the reduction in particle size, thereby deteriorating the dispersibility in a binder resin upon production of the magnetic toner.

When the anisotropic magnetic iron oxide particles are used as core particles, the upper limit of the aspect ratio of the obtained black magnetic composite particles according to the present invention, is usually 20:1, preferably 18:1, more preferably 15:1. When the aspect ratio is more than 20:1, the black magnetic composite particles may be entangled with each other in the binder resin, so that the dispersibility in binder resin tends to be deteriorated.

The geometrical standard deviation value of the black magnetic composite particles according to the present invention is preferably not more than 2.0, more preferably 1.01 to 1.8, still more preferably 1.01 to 1.6. The lower limit of the geometrical standard deviation value thereof is preferably 1.01. When the geometrical standard deviation value thereof is more than 2.0, the tinting strength of the black magnetic composite particles is likely to be deteriorated due to the existence of coarse particles therein. It is industrially difficult to obtain such particles having a geometrical standard deviation of less than 1.01.

The BET specific surface area of the black magnetic composite particles according to the present invention, is usually 1 to 200 $m^2/g$, preferably 2 to 150 $m^2/g$, more preferably 2.5 to 100 $m^2/g$. When the BET specific surface area thereof is less than 1 $m^2/g$, the obtained black magnetic composite particles may be coarse, and the sintering between the black magnetic composite particles is caused, thereby deteriorating the tinting strength. On the other hand, when the BET specific surface area is more than 200 $m^2/g$, the black magnetic composite particles tend to be agglomerated together by the increase in intermolecular force due to the reduction in particle size, thereby deteriorating the dispersibility in a binder resin upon production of the magnetic toner.

As to the fluidity of the black magnetic composite particles according to the present invention, the fluidity index thereof is preferably 45 to 80, more preferably 46 to 80, still more preferably 47 to 80. When the fluidity index thereof is less than 45, the fluidity of the black magnetic composite particles becomes insufficient, thereby failing to improve the fluidity of the finally obtained magnetic toner. Further, in the production process of the magnetic toner, there tend to be caused defects such as clogging of hopper, etc., thereby deteriorating the handling property or workability.

As to the blackness of the black magnetic composite particles according to the present invention, in the case magnetite particles are used as core particles, the upper limit of the blackness of the black magnetic composite particles is usually 20.0, preferably 19.0, more preferably 18.0 when represented by L* value. In the case maghemite particles are used as core particles, the upper limit of the blackness of the black magnetic composite particles is usually 20.0, preferably 19.5, more preferably 19.0 when represented by L* value. When the L* value thereof is more than 20.0, the lightness of the obtained black magnetic composite particles becomes high, so that the black magnetic composite particles having a sufficient blackness cannot be obtained. The lower limit of the blackness thereof is 15 when represented by L* value.

The dispersibility in binder resin of the black magnetic composite particles according to the present invention, is preferably 4th or 5th rank, more preferably 5th rank when evaluated by the method described hereinafter.

The percentage of desorption of carbon black from the black magnetic composite particles according to the present invention, is preferably not more than 20%, more preferably not more than 10%. When the desorption percentage of the carbon black is more than 20%, the desorbed carbon black tend to inhibit the black magnetic composite particles from being uniformly dispersed in the binder resin upon production of the magnetic toner.

The magnetic properties of the black magnetic composite particles according to the present invention, can be controlled by appropriately selecting kind and particle shape of the magnetic iron oxide particles as core particles. Similarly to magnetic properties of magnetic particles ordinarily used for the production of magnetic toner, the coercive force of the black magnetic composite particles according to the present invention, is usually about 10 to about 350 Oe, preferably about 20 to about 330 Oe; the saturation magnetization in a magnetic field of 10 kOe is usually about 50 to about 91 emu/g, preferably about 60 to about 90 emu/g; and the residual magnetization in a magnetic field of 10 kOe is usually about 1 to about 35 emu/g, preferably about 3 to about 30 emu/g.

The coating layer formed on the surfaces of the core particles comprises at least one organosilicon compound selected from the group consisting of (1) organosilane compounds obtainable from alkoxysilane compounds; (2) polysiloxanes, or modified polysiloxanes selected from the group consisting of (A) polysiloxanes modified with at least one compound selected from the group consisting of polyethers, polyesters and epoxy compounds (hereinafter referred to merely as "modified polysiloxanes"), and (B) polysiloxanes whose molecular terminal is modified with at least one group selected from the group consisting of carboxylic acid groups, alcohol groups and a hydroxyl group; and (3) fluoroalkyl organosilane compounds obtainable from fluoroalkylsilane compounds.

The organosilane compounds (1) may be produced by drying or heat-treating alkoxysilane compounds represented by the formula (I):

$$R^1_aSiX_{4-a} \qquad (I)$$

wherein $R^1$ is $C_6H_5$—, $(CH_3)_2CHCH_2$— or n-$C_bH_{2b+1}$— (wherein b is an integer of 1 to 18); X is $CH_3O$— or $C_2H_5O$—; and a is an integer of 0 to 3.

The drying or heat-treatment of the alkoxysilane compounds may be conducted, for example, at a temperature of usually 40 to 200° C., preferably 60 to 150° C. for usually 10 minutes to 12 hours, preferably 30 minutes to 3 hours.

Specific examples of the alkoxysilane compounds may include methyl triethoxysilane, dimethyl diethoxysilane, phenyl triethyoxysilane, diphenyl diethoxysilane, methyl trimethoxysilane, dimethyl dimethoxysilane, phenyl trimethoxysilane, diphenyl dimethoxysilane, isobutyl trimethoxysilane, decyl trimethoxysilane or the like. Among these alkoxysilane compounds, in view of the desorption percentage and the adhering effect of carbon black, methyl triethoxysilane, phenyl triethyoxysilane, methyl trimethoxysilane, dimethyl dimethoxysilane and isobutyl trimethoxysilane are preferred, and methyl triethoxysilane and methyl trimethoxysilane are more preferred.

As the polysiloxanes (2), there may be used those compounds represented by the formula (II):

(II)

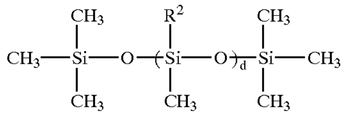

wherein $R^2$ is H— or $CH_3$—, and d is an integer of 15 to 450.

Among these polysiloxanes, in view of the desorption percentage and the adhering effect of carbon black, polysiloxanes having methyl hydrogen siloxane units are preferred.

As the modified polysiloxanes (2-A), there may be used:

(a1) polysiloxanes modified with polyethers represented by the formula (III):

(III)

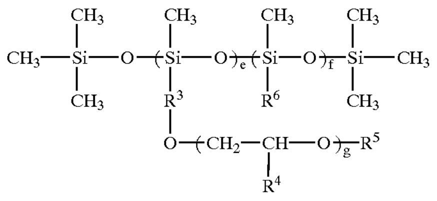

wherein $R^3$ is —(—$CH_2$—$)_h$—; $R^4$ is —(—$CH_2$—$)_i$—$CH_3$; $R^5$ is —OH, —COOH, —CH=$CH_2$, —C($CH_3$)=$CH_2$ or —(—$CH_2$—$)_j$—$CH_3$; $R^6$ is —(—$CH_2$—$)_k$—$CH_3$; g and h are an integer of 1 to 15; i, j and k are an integer of 0 to 15; e is an integer of 1 to 50; and f is an integer of 1 to 300;

(a2) polysiloxanes modified with polyesters represented by the formula (IV):

(IV)

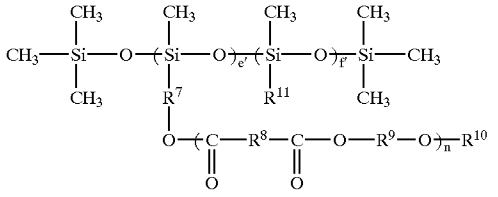

wherein $R^7$, $R^8$ and $R^9$ are $—(—CH_2—)_q—$ and may be the same or different; $R^{10}$ is —OH, —COOH, $—CH{=}CH_2$, $—C(CH_3){=}CH_2$ or $—(—CH_2—)_r—CH_3$; $R^{11}$ is $—(—CH_2—)_s—CH_3$; n and q are an integer of 1 to 15; r and s are an integer of 0 to 15; e' is an integer of 1 to 50; and f' is an integer of 1 to 300;

(a3) polysiloxanes modified with epoxy compounds represented by the formula (V):

(V)

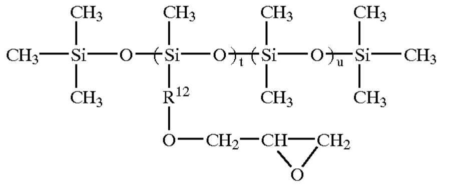

wherein $R^{12}$ is $—(—CH_2—)_v—$; v is an integer of 1 to 15; t is an integer of 1 to 50; and u is an integer of 1 to 300; or a mixture thereof.

Among these modified polysiloxanes (2-A), in view of the desorption percentage and the adhering effect of carbon black, the polysiloxanes modified with the polyethers represented by the formula (III), are preferred.

As the terminal-modified polysiloxanes (2-B), there may be used those represented by the formula (VI):

(VI)

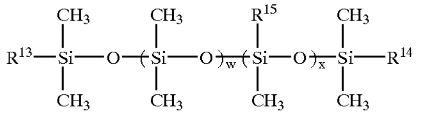

wherein $R^{13}$ and $R^{14}$ are —OH, $R^{16}OH$ or $R^{17}COOH$ and may be the same or different; $R^{15}$ is $—CH_3$ or $—C_6H_5$; $R^{16}$ and $R^{17}$ are $—(—CH_2—)_y—$; y is an integer of 1 to 15; w is an integer of 1 to 200; and x is an integer of 0 to 100.

Among these terminal-modified polysiloxanes, in view of the desorption percentage and the adhering effect of carbon black, the polysiloxanes whose terminals are modified with carboxylic acid groups are preferred.

The fluoroalkyl organosilane compounds (3) may be produced by drying or heat-treating fluoroalkylsilane compounds represented by the formula (VII):

$$CF_3(CF_2)_zCH_2CH_2(R^{18})_{a'}SiX_{4-a'} \qquad (VII)$$

wherein $R^{18}$ is $CH_3—$, $C_2H_5—$, $CH_3O—$ or $C_2H_5O—$; X is $CH_3O—$ or $C_2H_5O—$; and z is an integer of 0 to 15; and a' is an integer of 0 to 3.

The drying or the heat-treatment of the fluoroalkylsilane compounds may be conducted, for example, at a temperature of usually 40 to 200° C., preferably 60 to 150° C. for usually 10 minutes to 12 hours, preferably 30 minutes to 3 hours.

Specific examples of the fluoroalkylsilane compounds may include trifluoropropyl trimethoxysilane, tridecafluorooctyl trimethoxysilane, heptadecafluorodecyl trimethoxysilane, heptadecafluorodecylmethyl dimethoxysilane, trifluoropropyl triethoxysilane, tridecafluorooctyl triethoxysilane, heptadecafluorodecyl triethoxysilane, heptadecafluorodecylmethyl diethoxysilane or the like. Among these fluoroalkylsilane compounds, in view of the desorption percentage and the adhering effect of carbon black, trifluoropropyl trimethoxysilane, tridecafluorooctyl trimethoxysilane and heptadecafluorodecyl trimethoxysilane are preferred, and trifluoropropyl trimethoxysilane and tridecafluorooctyl trimethoxysilane are more preferred.

The amount of the coating layer composed of the organosilicon compounds is usually 0.02 to 5.0% by weight, preferably 0.03 to 4.0% by weight, more preferably 0.05 to 3.0% by weight (calculated as Si) based on the weight of the magnetic iron oxide particles coated with the organosilicon compounds.

When amount of the coating layer composed of the organosilicon compounds is less than 0.02% by weight, it becomes difficult to adhere the carbon black on the surfaces of the magnetic iron oxide particles in such an amount enough to improve the fluidity and blackness of the obtained black magnetic composite particles.

On the other hand, when the coating amount of the organosilicon compounds is more than 5.0% by weight, a sufficient amount of the carbon black coat can be formed on the surfaces of the coating layer. However, the use of such unnecessarily large amount of the organosilicon compounds is meaningless because the effect of enhancing the fluidity or blackness of the obtained black magnetic composite particles is already saturated.

As the carbon black fine particles used in the present invention, there may be exemplified commercially available carbon blacks such as furnace black, channel black or the like. Specific examples of the commercially available carbon blacks usable in the present invention, may include #3050, #3150, #3250, #3750, #3950, MA-100, MA7, #1000, #2400B, #30, MA8, MA11, #50, #52, #45, #2200B, MA600, etc. (tradename, produced by MITSUBISHI CHEMICAL CORP.), SEAST 9H, SEAST 7H, SEAST 6, SEAST 3H, SEAST 300, SEAST FM, etc. (tradename, produced by TOKAI CARBON CO., LTD.), Raven 1250, Raven 860, Raven 1000, Raven 1190 ULTRA, etc. (tradename, produced by COLOMBIAN CHEMICALS COMPANY), Ketchen black EC, Ketchen black EC600JD, etc. (tradename, produced by KETCHEN INTERNATIONAL CO., LTD.), BLACK PEARLS-L, BLACK PEARLS 1000, BLACK PEARLS 4630, VULCAN XC72, REGAL 660, REGAL 400, etc. (tradename, produced by CABOTT SPECIALTY CHEMICALS INK CO., LTD.), or the like. In view of the compatibility with the organosilicon compounds, MA-100, MA7, #1000, #2400B and #30 are preferred.

The lower limit of the average particle size of the carbon black fine particles used is usually 0.002 μm, preferably 0.005 μm, and upper limit thereof is usually 0.05 μm. preferably 0.035 μm. When the average particle size of the carbon black fine particles used is less than 0.002 μm, the carbon black fine particles used are too fine to be well handled.

On the other hand, when the average particle size thereof is more than 0.05 μm, since the particle size of the carbon black fine particles used is much larger, it is necessary to apply a larger mechanical shear force for forming the uniform carbon black coat on the coating layer composed of the organosilicon compounds, thereby rendering the coating process industrially disadvantageous.

The amount of the carbon black coat formed is 1 to 25 parts by weight based on 100 parts by weight of the magnetic iron oxide particles as core particles.

When the amount of the carbon black coat formed is less than 1 part by weight, the amount of the carbon black is insufficient, so that it becomes difficult to obtain black magnetic composite particles having a sufficient fluidity and blackness.

On the other hand, when the amount of the carbon black coat formed is more than 25 parts by weight, the obtained black magnetic composite particles can show a sufficient fluidity and blackness. However, since the amount of the carbon black is considerably large, the carbon black tend to be desorbed from the coating layer composed of the organosilicon compound. As a result, the obtained black magnetic composite particles tend to be deteriorated in dispersibility in a binder resin upon the production of magnetic toner.

The thickness of carbon black coat formed is preferably not more than 0.04 μm, more preferably not more than 0.03 μm, still more preferably not more than 0.02 μm. The lower limit thereof is more preferably 0.0001 μm.

In the black magnetic composite particles according to the present invention, at least a part of the surface of the magnetic iron oxide particle as core particle may be preliminarily coated with at least one compound selected from the group consisting of hydroxides of aluminum, oxides of aluminum, hydroxides of silicon and oxides of silicon (hereinafter referred to as "hydroxides and/or oxides of aluminum and/or silicon coat"), if necessary. In this case, the obtained black magnetic composite particles can show a higher dispersibility in a binder resin as compared to in the case where the magnetic iron oxide particles are uncoated with hydroxides and/or oxides of aluminum and/or silicon.

The amount of the hydroxides and/or oxides of aluminum and/or silicon coat is preferably 0.01 to 50% by weight (calculated as Al, $SiO_2$ or a sum of Al and $SiO_2$) based on the weight of the magnetic iron oxide particles as core particles.

When the amount of the hydroxides and/or oxides of aluminum and/or silicon coat is less than 0.01% by weight, the effect of enhancing the dispersibility of the obtained black magnetic composite particles in a binder resin upon the production of magnetic toner cannot be obtained.

On the other hand, when the amount of the hydroxides and/or oxides of aluminum and/or silicon coat is more than 50% by weight, the obtained black magnetic composite particles can exhibit a good dispersibility in a binder resin upon the production of magnetic toner. However, such unnecessarily large amount of the hydroxides and/or oxides of aluminum and/or silicon coat is meaningless.

The particle size, geometrical standard deviation, BET specific surface area, fluidity, blackness L* value and desorption percentage of carbon black of the black magnetic composite particles wherein the surface of the core particle is coated with the hydroxides and/or oxides of aluminum and/or silicon according to the present invention, are substantially the same as those of the black magnetic composite particles wherein the core particle is uncoated with the hydroxides and/or oxides of aluminum and/or silicon according to the present invention.

The black magnetic composite particles used for the black magnetic toner according to the present invention can be produced by the following method.

Among the isotropic magnetite particles which are magnetic iron oxide particles, (1) octahedral magnetite particles can be produced by passing an oxygen-containing gas through a suspension containing ferrous hydroxide colloid having a pH value of not less than 10, which is obtained by reacting an aqueous ferrous salt solution with an aqueous alkali solution having a concentration of not less than one equivalent based on $Fe^{2+}$ in the aqueous ferrous salt solution, thereby precipitating magnetite particles, and then subjecting the obtained magnetite particles to filtering, washing with water and drying (Japanese Patent Publication (KOKOKU) No. 44-668(1969); (2) hexahedral magnetite particles can be produced by passing an oxygen-containing gas through a suspension containing ferrous hydroxide colloid having a pH value of 6.0 to 7.5, which is obtained by reacting an aqueous ferrous salt solution with an aqueous alkali solution having a concentration of not more than one equivalent based on $Fe^{2+}$ in the aqueous ferrous salt solution to produce magnetite core particles, further passing an oxygen-containing gas through the obtained aqueous ferrous salt reaction solution containing the magnetite core particles and the ferrous hydroxide colloid, at a pH value of 8.0 to 9.5, to precipitate magnetite particles, and then subjecting the precipitated magnetite particles to filtering, washing with water and drying (Japanese Patent Application Laid-Open (KOKAI) No. 3 -201509(1991); (3) spherical magnetite particles can be produced by passing an oxygen-containing gas through a suspension containing ferrous hydroxide colloid having a pH value of 6.0 to 7.5, which is obtained by reacting an aqueous ferrous salt solution with an aqueous alkali solution having a concentration of not more than one equivalent based on $Fe^{2+}$ in the aqueous ferrous salt solution to produce magnetite core particles, adding alkali hydroxide in an amount of not less than equivalent based on the remaining $Fe^{2+}$ to adjust the pH value of the suspension to not less than 10, heat-oxidizing the resultant suspension to precipitate magnetite particles, and then subjecting the precipitated magnetite particles to filtering, washing with water and drying (Japanese Patent Publication (KOKOKU) No. 62-51208(1987).

The isotropic maghemite particles can be obtained by heating the above-mentioned isotropic magnetite particles in air at 300 to 600° C.

The anisotropic magnetite particles can be produced by passing an oxygen-containing gas through a suspension containing either ferrous hydroxide colloid, iron carbonate, or an iron-containing precipitate obtained by reacting an aqueous ferrous salt solution with alkali hydroxide and/or alkali carbonate, while appropriately controlling the pH value and temperature of the suspension, to produce acicular, spindle-shaped or rice ball-shaped goethite particles, subjecting the obtained goethite particles to filtering, washing with water and drying, and then reducing the goethite particles in a heat-reducing gas at 300 to 800° C.

The anisotropic maghemite particles can be produced by heat-oxidizing the above-mentioned anisotropic magnetite particles in an oxygen-containing gas at 300 to 600° C.

The coating of the magnetic iron oxide particles with the alkoxysilane compounds, the polysiloxanes, the modified polysiloxanes, the terminal-modified polysiloxanes or the fluoroalkylsilane compounds, may be conducted (i) by mechanically mixing and stirring the magnetic iron oxide particles together with the alkoxysilane compounds, the polysiloxanes, the modified polysiloxanes, the terminal-modified polysiloxanes or the fluoroalkylsilane compounds; or (ii) by mechanically mixing and stirring both the components together while spraying the alkoxysilane compounds, the polysiloxanes, the modified polysiloxanes, the terminal-modified polysiloxanes or the fluoroalkylsilane compounds onto the magnetic iron oxide particles. In these cases, substantially whole amount of the alkoxysilane compounds, the polysiloxanes, the modified polysiloxanes, the terminal-modified polysiloxanes or the fluoroalkylsilane compounds added can be applied onto the surfaces of the magnetic iron oxide particles.

In order to uniformly coat the surfaces of the magnetic iron oxide particles with the alkoxysilane compounds, the polysiloxanes, the modified polysiloxanes, the terminal-modified polysiloxanes or the fluoroalkylsilane compounds, it is preferred that the magnetic iron oxide particles are preliminarily diaggregated by using a pulverizer.

As apparatus (a) for mixing and stirring the core particles with the alkoxysilane compounds, the polysiloxanes, the modified polysiloxanes, the terminal-modified polysiloxanes or the fluoroalkylsilane compounds to form the coating layer thereof, and (b) for mixing and stirring carbon black fine particles with the particles whose surfaces are coated with the alkoxysilane compounds, the polysiloxanes, the modified polysiloxanes, the terminal-modified polysiloxanes or the fluoroalkylsilane compounds to form the carbon black coat, there may be preferably used those apparatus capable of applying a shear force to the particles, more preferably those apparatuses capable of conducting the application of shear force, spatulate-force and compressed-force at the same time. In addition, by conducting the above mixing or stirring treatment (a) of the core particles together with the alkoxysilane compounds, the polysiloxanes, the modified polysiloxanes, the terminal-modified polysiloxanes or the fluoroalkylsilane compounds, at least a part of the alkoxysilane compounds and the fluoroalkylsilane compounds coated on the core particles may be changed to the organosilane compounds and fluoroalkyl organosilane compounds, respectively.

As such apparatuses, there may be exemplified wheel-type kneaders, ball-type kneaders, blade-type kneaders, roll-type kneaders or the like. Among them, wheel-type kneaders are preferred.

Specific examples of the wheel-type kneaders may include an edge runner (equal to a mix muller, a Simpson mill or a sand mill), a multi-mull, a Stotz mill, a wet pan mill, a Conner mill, a ring muller, or the like. Among them, an edge runner, a multi-mull, a Stotz mill, a wet pan mill and a ring muller are preferred, and an edge runner is more preferred. Specific examples of the ball-type kneaders may include a vibrating mill or the like. Specific examples of the blade-type kneaders may include a Henschel mixer, a planetary mixer, a Nawter mixer or the like. Specific examples of the roll-type kneaders may include an extruder or the like.

In order to coat the surfaces of the core particles with the alkoxysilane compounds, the polysiloxanes, the modified polysiloxanes, the terminal-modified polysiloxanes or the fluoroalkylsilane compounds as uniformly as possible, the conditions of the above mixing or stirring treatment may be appropriately controlled such that the linear load is usually 2 to 200 Kg/cm, preferably 10 to 150 kg/cm, more preferably 15 to 100 kg/cm; and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the alkoxysilane compounds, the polysiloxanes, the modified polysiloxanes, the terminal-modified polysiloxanes or the fluoroalkylsilane compounds added, is preferably 0.15 to 45 parts by weight based on 100 parts by weight of the magnetic iron oxide particles. When the amount of the alkoxysilane compounds, the polysiloxanes, the modified polysiloxanes, the terminal-modified polysiloxanes or the fluoroalkylsilane compounds added is less than 0.15 part by weight, it may become difficult to form the carbon black coat in such an amount enough to improve the blackness and flowability of the obtained black magnetic composite particles.

On the other hand, when the amount of the alkoxysilane compounds, the polysiloxanes, the modified polysiloxanes, the terminal-modified polysiloxanes or the fluoroalkylsilane compounds added is more than 45 parts by weight, a sufficient amount of the carbon black coat can be formed on the surface of the coating, but it is meaningless because the blackness and flowability of the composite particles cannot be further improved by using such an excess amount of the alkoxysilane compounds, the polysiloxanes, the modified polysiloxanes, the terminal-modified polysiloxanes or the fluoroalkylsilane compounds added.

Next, the carbon black fine particles are added to the magnetic iron oxide particles coated with the alkoxysilane compounds, the polysiloxanes, the modified polysiloxanes, the terminal-modified polysiloxanes or the fluoroalkylsilane compounds, and the resultant mixture is mixed and stirred to form the carbon black coat on the surfaces of the coating composed of the alkoxysilane compounds, the polysiloxanes, the modified polysiloxanes, the terminal-modified polysiloxanes or the fluoroalkylsilane compounds added. In addition, by conducting the above mixing or stirring treatment (b) of the carbon black fine particles together with the magnetic iron oxide particles coated with the alkoxysilane compounds, the polysiloxanes, the modified polysiloxanes, the terminal-modified polysiloxanes or the fluoroalkylsilane compounds, at least a part of the alkoxysilane compounds and the fluoroalkylsilane compounds coated on the magnetic iron oxide particles may be changed to the organosilane compounds and fluoroalkyl organosilane compounds, respectively.

In the case where the alkoxysilane compounds and the fluoroalkylsilane compounds are used as the coating compound, after the carbon black coat is formed on the surface of the coating layer, the resultant composite particles may be dried or heat-treated, for example, at a temperature of usually 40 to 200° C., preferably 60 to 150° C. for usually 10 minutes to 12 hours, preferably 30 minutes to 3 hours, thereby forming a coating layer composed of the organosilane compounds (1) and the fluoroalkyl organosilane compounds (3), respectively.

It is preferred that the carbon black fine particles are added little by little and slowly, especially about 5 to 60 minutes.

In order to form carbon black onto the coating layer composed of the alkoxysilane compounds, the polysiloxanes, the modified polysiloxanes, the terminal-modified polysiloxanes or the fluoroalkylsilane compounds as uniformly as possible, the conditions of the above mixing or stirring treatment can be appropriately controlled such that the linear load is usually 2 to 200 Kg/cm, preferably 10 to 150 Kg/cm more preferably 15 to 100 Kg/cm; and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the carbon black fine particles added, is preferably 1 to 25 parts by weight based on 100 parts by weight of the magnetic iron oxide particles. When the amount of the carbon black fine particles added is less than 1 part by weight, it may become difficult to form the carbon black coat in such an amount enough to improve the blackness and flowability of the obtained composite particles. On the other hand, when the amount of the carbon black fine particles added is more than 25 parts by weight, a sufficient blackness and flowability of the resultant composite particles can be obtained, but the carbon black tend to be desorbed from the surface of the coating layer because of too large amount of the carbon black adhered, resulting in deteriorated dispersibility in the binder resin upon the production of the magnetic toner.

At least a part of the surface of the magnetic iron oxide particles may be coated with at least one compound selected from the group consisting of hydroxides of aluminum, oxides of aluminum, hydroxides of silicon and oxides of silicon, if required, in advance of mixing and stirring with the alkoxysilane compounds, the polysiloxanes, the modified polysiloxanes, the terminal-modified polysiloxanes or the fluoroalkylsilane compounds.

The coat of the hydroxides and/or oxides of aluminum and/or silicon may be conducted by adding an aluminum compound, a silicon compound or both the compounds to a water suspension in which the magnetic iron oxide particles are dispersed, followed by mixing and stirring, and further adjusting the pH value of the suspension, if required, thereby coating the surfaces of the magnetic iron oxide particles with at least one compound selected from the group consisting of hydroxides of aluminum, oxides of aluminum, hydroxides of silicon and oxides of silicon. The thus obtained particles coated with the hydroxides and/or oxides of aluminum and/or silicon are then filtered out, washed with water, dried and pulverized. Further, the particles coated with the hydroxides and/or oxides of aluminum and/or silicon may be subjected to post-treatments such as deaeration treatment and compaction treatment, if required.

As the aluminum compounds, there may be exemplified aluminum salts such as aluminum acetate, aluminum sulfate, aluminum chloride or aluminum nitrate, alkali aluminates such as sodium aluminate, alumina sols or the like.

The amount of the aluminum compound added is 0.01 to 50% by weight (calculated as Al) based on the weight of the magnetic iron oxide particles. When the amount of the aluminum compound added is less than 0.01% by weight, it may be difficult to sufficiently coat the surfaces of the magnetic iron oxide particles with hydroxides and/or oxides of aluminum, thereby failing to achieve the improvement of the dispersibility in the binder resin upon the production of the magnetic toner. On the other hand, when the amount of the aluminum compound added is more than 50% by weight, the coating effect is saturated and, therefore, it is meaningless to add such an excess amount of the aluminum compound.

As the silicon compounds, there may be exemplified water glass #3, sodium orthosilicate, sodium metasilicate, colloidal silica or the like.

The amount of the silicon compound added is 0.01 to 50% by weight (calculated as $SiO_2$) based on the weight of the magnetic iron oxide particles. When the amount of the silicon compound added is less than 0.01% by weight, it may be difficult to sufficiently coat the surfaces of the magnetic iron oxide particles with hydroxides and/or oxides of silicon, thereby failing to achieve the improvement of the dispersibility in the binder resin upon the production of the magnetic toner. On the other hand, when the amount of the silicon compound added is more than 50% by weight, the coating effect is saturated and, therefore, it is meaningless to add such an excess amount of the silicon compound.

In the case where both the aluminum and silicon compounds are used in combination for the coating, the total amount of the aluminum and silicon compounds added is preferably 0.01 to 50% by weight (calculated as a sum of Al and $SiO_2$) based on the weight of the magnetic iron oxide particles.

Next, the black magnetic toner according to the present invention is described.

The black magnetic toner according to the present invention comprises the black magnetic composite particles, and a binder resin. The black magnetic toner may further contain a mold release agent, a colorant, a charge-controlling agent and other additives, if necessary.

The black magnetic toner according to the present invention has an average particle size of usually 3 to 15 $\mu$m, preferably 5 to 12 $\mu$m.

The amount of the binder resin used in the black magnetic toner is usually 50 to 900 parts by weight, preferably 50 to 400 parts by weight based on 100 parts by weight of the black magnetic composite particles.

As the binder resins, there may be used vinyl-based polymers, i.e., homopolymers or copolymers of vinyl-based monomers such as styrene, alkyl acrylates and alkyl methacrylates. As the styrene monomers, there may be exemplified styrene and substituted styrenes. As the alkyl acrylate monomers, there may be exemplified acrylic acid, methyl acrylate, ethyl acrylate, butyl acrylate or the like.

It is preferred that the above copolymers contain styrene-based components in an amount of usually 50 to 95% by weight.

In the binder resin used in the present invention, the above-mentioned vinyl-based polymers may be used in combination with polyester-based resins, epoxy-based resins, polyurethane-based resins or the like, if necessary.

As to the fluidity of the black magnetic toner according to the present invention, the fluidity index is usually 70 to 100, preferably 71 to 100, more preferably 72 to 100. When the fluidity index is less than 70, the black magnetic toner may not show a sufficient fluidity.

The blackness of the black magnetic toner according to the present invention is usually not more than 20, preferably not more than 19.8, more preferably not more than 19.5 when represented by L* value. When the blackness thereof is more than 20, the lightness of the black magnetic toner may be increased, resulting in insufficient blackness. The lower limit of the blackness of the black magnetic toner is usually about 15 when represented by L* value.

The volume resistivity of the black magnetic toner according to the present invention, is usually not less than $1.0\times10^{13}$ Ω·cm, preferably not less than $3.0\times10^{13}$ Ω·cm, more preferably not less than $5.0\times10^{13}$ Ω·cm. When the volume resistivity is less than $1.0\times10^{13}$ Ω·cm, the charge amount of the black magnetic toner tends to vary depending upon environmental conditions in which the toner is used, resulting in unstable properties of the black magnetic toner. The upper limit of the volume resistivity is $1.0\times10^{15}$ Ω·cm.

As to the magnetic properties of the black magnetic toner according to the present invention, the coercive force thereof is usually 10 to 350 Oe, preferably 20 to 330 Oe; the saturation magnetization value in a magnetic field of 10 kOe is usually 10 to 85 emu/g, preferably 20 to 80 emu/g; the residual magnetization in a magnetic field of 10 kOe is usually 1 to 20 emu/g, preferably 2 to 15 emu/g; the saturation magnetization in a magnetic field of 1 kOe is usually 7.5 to 65 emu/g, preferably 10 to 60 emu/g; and the residual magnetization in a magnetic field of 1 kOe is usually 0.5 to 15 emu/g, preferably 1.0 to 13 emu/g.

The black magnetic toner according to the present invention may be produced by a known method of mixing and kneading a predetermined amount of a binder resin and a predetermined amount of the black magnetic composite particles together, and then pulverizing the mixed and kneaded material into particles. More specifically, the black magnetic composite particles and the binder resin are intimately mixed together with, if necessary, a mold release agent, a colorant, a charge-controlling agent or other additives by using a mixer. The obtained mixture is then melted and kneaded by a heating kneader so as to render the respective components compatible with each other, thereby dispersing the black magnetic composite particles therein. Successively, the molten mixture is cooled and solidified to obtain a resin mixture. The obtained resin mixture is then pulverized and classified, thereby producing a magnetic toner having an aimed particle size.

As the mixers, there may be used a Henschel mixer, a ball mill or the like. As the heating kneaders, there may be used a roll mill, a kneader, a twin-screw extruder or the like. The pulverization of the resin mixture may be conducted by using pulverizers such as a cutter mill, a jet mill or the like. The classification of the pulverized particles may be conducted by known methods such as air classification, etc., as described in Japanese Patent No. 2683142 or the like.

As the other method of producing the black magnetic toner, there may be exemplified a suspension polymerization method or an emulsion polymerization method. In the suspension polymerization method, polymerizable monomers and the black magnetic composite particles are intimately mixed together with, if necessary, a colorant, a polymerization initiator, a cross-linking agent, a charge-controlling agent or the other additives and then the obtained mixture is dissolved and dispersed together so as to obtain a monomer composition. The obtained monomer composition is added to a water phase containing a suspension stabilizer while stirring, thereby granulating and polymerizing the composition to form magnetic toner particles having an aimed particle size.

In the emulsion polymerization method, the monomers and the black magnetic composite particles are dispersed in water together with, if necessary, a colorant, a polymerization initiator or the like and then the obtained dispersion is polymerized while adding an emulsifier thereto, thereby producing magnetic toner particles having an aimed particle size.

A point of the present invention exists in that the black magnetic composite particles comprising as core particles the magnetic iron oxide particles which have an average particle size of 0.055 to 0.95 $\mu$m and may be coated with at least one compound selected from the group consisting of hydroxides of aluminum, oxides of aluminum, hydroxides of silicon and oxides of silicon; the organosilicon compounds coated on the surface of the magnetic iron oxide particle; the carbon black coat formed on the surface of the coating layer composed of the organosilicon compounds in an amount of 1 to 25 parts by weight based on 100 parts by weight of the magnetic iron oxide particles, can show not only excellent fluidity and blackness, but also an excellent dispersibility in a binder resin upon the production of magnetic toner due to less amount of carbon black desorbed or fallen-off from the surfaces of the particles.

The reason why the amount of the carbon black desorbed or fallen-off from the surfaces of the black magnetic composite particles according to the present invention, is small, is considered as follows. That is, the organosilicon compounds and the surfaces of the magnetic iron oxide particles are strongly bonded to each other, so that the carbon black bonded to the surfaces of the magnetic iron oxide particles through the organosilicon compounds can be prevented from being desorbed from the magnetic iron oxide particles.

In particular, in the case of the alkoxysilane compounds (1) and the fluoroalkylsilane compounds (3), metalloxane bonds ($\equiv$Si—O—M wherein M represents a metal atom contained in the black iron oxide particles, such as Si, Al, Fe or the like) are formed between the surfaces of the magnetic iron oxide particles and alkoxy groups contained in the organosilicon compounds onto which the carbon black coat is formed, thereby forming a stronger bond between the organosilicon compounds on which the carbon black coat is formed, and the surfaces of the magnetic iron oxide particles.

The reason why the black magnetic composite particles according to the present invention can show an excellent dispersibility in a binder resin upon the production of magnetic toner, is considered such that since only a small amount of the carbon black is desorbed or fallen-off from the surfaces of the black magnetic composite particles, the black magnetic composite particles is free from deterioration in dispersibility due to the desorbed or fallen-off carbon black, and further since the carbon black coat is formed on the surfaces of the black magnetic composite particles and, therefore, irregularities are formed on the surfaces of the black magnetic composite particles, the contact between the particles can be suppressed.

The reason why the black magnetic composite particles according to the present invention can show an excellent fluidity, is considered as follows. That is, the carbon black fine particles which are ordinarily agglomerated together due to fineness thereof, are allowed to be uniformly and densely formed on the surfaces of the magnetic iron oxide particles and, therefore, can be dispersed nearly in the form of primary particles, so that many fine irregularities are formed on the surfaces of the magnetic iron oxide particles.

The reason why the black magnetic composite particles according to the present invention can show an excellent blackness, is considered such that since the carbon black coat are uniformly and densely formed on the surfaces of the magnetic iron oxide particles, the color tone of the core particles is hidden behind the carbon black, so that an inherent color tone of carbon black can be exhibited.

Therefore, the black magnetic toner produced by using the above black magnetic composite particles, can show excellent fluidity and blackness.

The reason why the black magnetic toner according to the present invention can show an excellent fluidity, is considered as follows. That is, the black magnetic composite particles on which a large amount of the carbon black is uniformly formed, are blended in the black magnetic toner, so that many fine irregularities are formed on the surface of the black magnetic toner.

The reason why the black magnetic toner according to the present invention can show an excellent blackness, is considered such that the black magnetic composite particles having an excellent blackness is blended in the black magnetic toner.

As described above, since the black magnetic composite particles according to the present invention, are excellent not only in fluidity and blackness, but also in dispersibility in a binder resin due to less amount of the carbon black desorbed or fallen-off from the surfaces thereof, the black magnetic composite particles according to the present invention, are suitable as black magnetic particles for black magnetic toner capable of attaining a high image quality and a high copying speed.

In addition, since the black magnetic composite particles according to the present invention, are excellent in dispersibility in a binder resin, the particles can show excellent handling property and workability and, therefore, are preferable from an industrial viewpoint.

Further, the black magnetic toner produced from the above black magnetic composite particles which are excellent in fluidity and blackness, can also show excellent fluidity and blackness. Accordingly, the black magnetic toner is suitable as black magnetic toner capable of attaining a high image quality and a high copying speed.

Furthermore, in the black magnetic toner according to the present invention, since the black magnetic composite particles contained therein are excellent in dispersibility, it is possible to expose the black magnetic composite particles to the surface of the black magnetic toner independently and separately. As a result, the black magnetic toner can be free from being deteriorated in electric resistance due to the existence of the carbon black coat. Accordingly, the black magnetic toner according to the present invention is suitable as a high-resistance or insulated magnetic toner.

EXAMPLES

The present invention is described in more detail by Examples and Comparative Examples, but the Examples are only illustrative and, therefore, not intended to limit the scope of the present invention.

Various properties were measured by the following methods.

(1) The average particle size, the average major axial diameter and average minor axial diameter of magnetite particles, maghemite particles, black magnetic composite particles and carbon black fine particles were respectively expressed by the average of values (measured in a predetermined direction) of about 350 particles which were sampled from a micrograph obtained by magnifying an original electron micrograph (×20,000) by four times in each of the longitudinal and transverse directions.

(2) The aspect ratio of the particles was expressed by the ratio of average major axial diameter to average minor axial diameter thereof.

(3) The geometrical standard deviation of particle sizes was expressed by values obtained by the following method. That is, the particle sizes (major axial diameters) were measured from the above magnified electron micrograph. The actual particle sizes (major axial diameters) and the number of the particles were calculated from the measured values. On a logarithmic normal probability paper, the particle sizes (major axial diameters) were plotted at regular intervals on the abscissa-axis and the accumulative number (under integration sieve) of particles belonging to each interval of the particle sizes (major axial diameters) were plotted by percentage on the ordinate-axis by a statistical technique.

The particle sizes (major axial diameters) corresponding to the number of particles of 50% and 84.13%, respectively, were read from the graph, and the geometrical standard deviation was calculated from the following formula:

Geometrical standard deviation={particle size (major axial diameters) corresponding to 84.13% under integration sieve}/{particle size (major axial diameters) (geometrical average diameter) corresponding to 50% under integration sieve}

The closer to 1 the geometrical standard deviation value, the more excellent the particle size distribution.

(4) The specific surface area was expressed by the value measured by a BET method.

(5) The amounts of Al and Si which were present within black magnetic composite particles or on surfaces thereof, and the amount of Si contained in the organosilicon compounds, were measured by a fluorescent X-ray spectroscopy device 3063 (manufactured by Rigaku Denki Kogyo Co., Ltd.) according to JIS K0119 "General rule of fluorescent X-ray analysis".

(6) The amount of carbon black coat formed on the surface of the black magnetic composite particles was measured by "Horiba Metal, Carbon and Sulfur Analyzer EMIA-2200 Model" (manufactured by Horiba Seisakusho Co., Ltd.).

(7) The thickness of carbon black coat formed on the surfaces of the black magnetic composite particles is expressed by the value which was obtained by first measuring an average thickness of carbon black coat formed onto the surfaces of the particles on a photograph (×5,000,000) obtained by magnifying (ten times) a micrograph (×500,000) produced at an accelerating voltage of 200 kV using a transmission-type electron microscope (JEM-2010, manufactured by Japan Electron Co., Ltd.), and then calculating an actual thickness of carbon black coat formed from the measured average thickness.

(8) The fluidity of magnetic iron oxide particles, black magnetic composite particles and magnetic toner was expressed by a fluidity index which was a sum of indices obtained by converting on the basis of the same reference measured values of an angle of repose, a degree of compaction (%), an angle of spatula and a degree of agglomeration as particle characteristics which were measured by a powder tester (tradename, produced by Hosokawa Micron Co., Ltd.). The closer to 100 the fluidity index, the more excellent the fluidity of the particles.

(9) The blackness of magnetic iron oxide particles, black magnetic composite particles and magnetic toner was measured by the following method. That is, 0.5 g of sample particles and 1.5 ml of castor oil were intimately kneaded together by a Hoover's muller to form a paste. 4.5 g of clear lacquer was added to the obtained paste and was intimately kneaded to form a paint. The obtained paint was applied on a cast-coated paper by using a 6-mil (150 $\mu$m) applicator to produce a coating film piece (having a film thickness of about 30 $\mu$m). The thus obtained coating film piece was measured according to JIS Z 8729 by a multi-light source spectrographic calorimeter MSC-IS-2D (manufactured by Suga Testing Machines Manufacturing Co., Ltd.) to determine an L* value of calorimetric indices thereof. The blackness was expressed by the L* value measured.

Here, the L* value represents a lightness, and the smaller the L* value, the more excellent the blackness.

(10) The desorption percentage of carbon black desorbed from the black magnetic composite particles was measured by the following method. The closer to zero the desorption percentage, the smaller the amount of carbon black desorbed from the surfaces of black magnetic composite particles.

That is, 3 g of the black magnetic composite particles and 40 ml of ethanol were placed in a 50-ml precipitation pipe and then was subjected to ultrasonic dispersion for 20 minutes. Thereafter, the obtained dispersion was allowed to stand for 120 minutes, and the carbon black desorbed were separated from the black magnetic composite particles on the basis of the difference in specific gravity between both the particles. Next, the black magnetic composite particles from which the desorbed carbon black was separated, were mixed again with 40 ml of ethanol, and the obtained mixture was further subjected to ultrasonic dispersion for 20 minutes. Thereafter, the obtained dispersion was allowed to stand for 120 minutes, thereby separating the black magnetic composite particles and the desorbed carbon black desorbed from each other. The thus obtained black magnetic composite particles were dried at 100° C. for one hour, and then the carbon content thereof was measured by the "Horiba Metal, Carbon and Sulfur Analyzer EMIA-2200 Model" (manufactured by Horiba Seisakusho Co., Ltd.). The desorption percentage of the carbon black was calculated according to the following formula:

$$\text{Desorption percentage of carbon black }(\%)=\{(W_a-W_e)/W_a\}\times 100$$

wherein $W_a$ represents an amount of carbon black initially formed on the black magnetic composite particles; and $W_e$ represents an amount of carbon black still adhered on the black magnetic composite particles after desorption test.

(11) The dispersibility in a binder resin of the black magnetic composite particles was evaluated by counting the number of undispersed agglomerated particles on a micrograph (×200 times) obtained by photographing a sectional area of the obtained black magnetic toner particle using an optical microscope (BH-2, manufactured by Olympus Kogaku Kogyo Co., Ltd.), and classifying the results into the following five ranks. The 5th rank represents the most excellent dispersing condition.

Rank 1: not less than 50 undispersed agglomerated particles per 0.25 $mm^2$ were recognized;

Rank 2: 10 to 49 undispersed agglomerated particles per 0.25 $mm^2$ were recognized;

Rank 3: 5 to 9 undispersed agglomerated particles per 0.25 $mm^2$ were recognized;

Rank 4: 1 to 4 undispersed agglomerated particles per 0.25 $mm^2$ were recognized;

Rank 5: No undispersed agglomerated particles were recognized.

(12) The average particle size of the black magnetic toner was measured by a laser diffraction-type particle size distribution-measuring apparatus (Model HELOSLA/KA, manufactured by Sympatec Corp.).

(13) The volume resistivity of the magnetic iron oxide particles, the black magnetic composite particles and the black magnetic toner was measured by the following method.

That is, first, 0.5 g of a sample particles or toner to be measured was weighted, and press-molded at 140 Kg/$cm^2$ using a KBr tablet machine (manufactured by Simazu Seisakusho Co., Ltd.), thereby forming a cylindrical test piece.

Next, the thus obtained cylindrical test piece was exposed to an atmosphere maintained at a temperature of 25° C. and a relative humidity of 60% for 12 hours. Thereafter, the cylindrical test piece was set between stainless steel electrodes, and a voltage of 15V was applied between the electrodes using a Wheatstone bridge (TYPE2768, manufactured by Yokogawa-Hokushin Denki Co., Ltd.) to measure a resistance value R (Ω).

The cylindrical test piece was measured with respect to an upper surface area A ($cm^2$) and a thickness $t_0$ (cm) thereof. The measured values were inserted into the following formula, thereby obtaining a volume resistivity X (Ω·cm).

$$X(\Omega\cdot\text{cm})=R\times(A/t_0)$$

(14) The magnetic properties of the magnetic iron oxide particles and the black magnetic composite particles were measured using a vibration sample magnetometer "VSM-3S-15" (manufactured by Toei Kogyo Co., Ltd.) by applying an external magnetic field of 10 kOe thereto. Whereas, the magnetic properties of the black magnetic toner were measured by applying external magnetic fields of 1 kOe and 10 kOe thereto.

Example 1

<Production of Black Magnetic Composite Particles>

20 kg of spherical magnetite particles shown in the electron micrograph (×20,000) of FIG. 1 (average particle size: 0.23 μm; geometrical standard deviation value: 1.42; BET specific surface area value: 9.2 $m^2$/g; blackness (L* value): 20.6; fluidity index: 35; coercive force value: 61 Oe; saturation magnetization value in a magnetic field of 10 kOe: 84.9 emu/g; residual magnetization value in a magnetic field of 10 kOe: 7.8 emu/g), were deagglomerated in 150 liters of pure water using a stirrer, and further passed through a "TK pipeline homomixer" (tradename, manufactured by Tokushu Kika Kogyo Co., Ltd.) three times, thereby obtaining a slurry containing the spherical magnetite particles.

Successively, the obtained slurry containing the spherical magnetite particles was passed through a transverse-type sand grinder (tradename "MIGHTY MILL MHG-1.5L", manufactured by Inoue Seisakusho Co., Ltd.) five times at an axis-rotating speed of 2,000 rpm, thereby obtaining a slurry in which the spherical magnetite particles were dispersed.

The particles in the obtained slurry which remained on a sieve of 325 meshes (mesh size: 44 μm) was 0%. The slurry was filtered and washed with water, thereby obtaining a filter cake containing the spherical magnetite particles. After the obtained filter cake containing the spherical magnetite particles was dried at 120° C., 11.0 kg of the dried particles were then charged into an edge runner "MPUV-2 Model" (tradename, manufactured by Matsumoto Chuzo Tekkosho Co., Ltd.), and mixed and stirred at 30 Kg/cm and a stirring speed of 22 rpm for 30 minutes, thereby lightly deagglomerating the particles.

220 g of methyl triethoxysilane was mixed and diluted with 200 ml of ethanol to obtain a methyl triethoxysilane solution. The methyl triethoxysilane solution was added to the deagglomerated spherical magnetite particles under the operation of the edge runner. The spherical magnetite particles were continuously mixed and stirred at a linear load of 60 Kg/cm and a stirring speed of 22 rpm for 60 minutes to form a coating layer composed of methyl triethoxysilane on the spherical magnetite particles.

Figure 2:
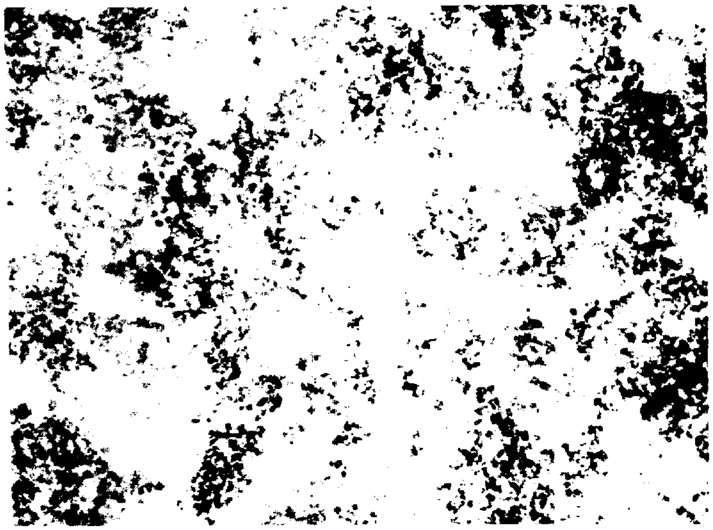
FIG. 2 is an electron micrograph (×20,000) showing a particle structure of carbon black fine particles used in Example 1.

Next, 990 g of carbon black fine particles shown in the electron micrograph (×20,000) of FIG. 2 (particle shape: granular shape; average particle size: 0.022 μm; geometrical standard deviation value: 1.68; BET specific surface area value: 134 $m^2$/g; and blackness (L* value): 16.6) were added to the spherical magnetite particles coated with methyl triethoxysilane for 10 minutes while operating the edge runner. Further, the mixed particles were continuously stirred at a linear load of 60 Kg/cm and a stirring speed of 22 rpm for 60 minutes to form the carbon black coat on the coating layer composed of methyl triethoxysilane, thereby obtaining black magnetic composite particles.

Figure 3:
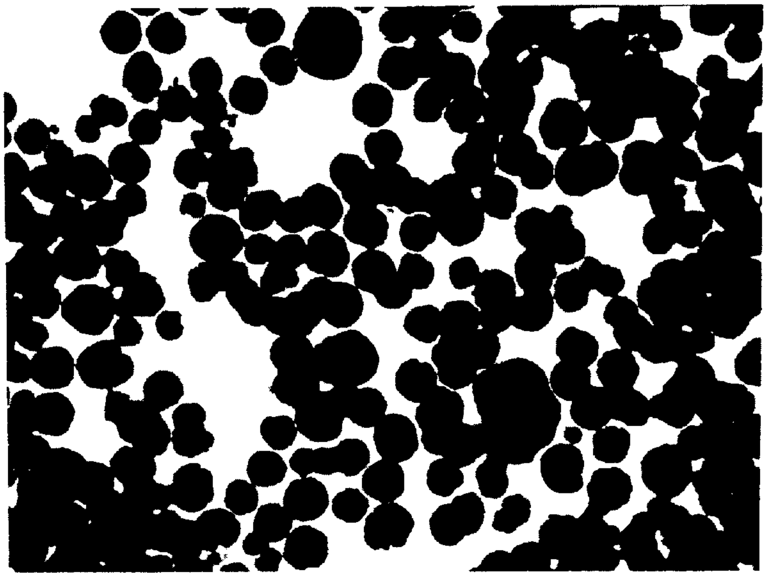
FIG. 3 is an electron micrograph (×20,000) showing a particle structure of black magnetic composite particles obtained in Example 1.

The obtained black magnetic composite particles were heat-treated at 105° C. for 60 minutes by using a drier to evaporate water, ethanol or the like which were remained on surfaces of the composite particles. As shown in the electron micrograph (×20,000) of FIG. 3, the resultant black magnetic composite particles had an average particle size of 0.24 μm. In addition, the black magnetic composite particles showed a geometrical standard deviation value of 1.42, a BET specific surface area value of 10.2 $m^2$/g, a fluidity index of 46 and a blackness (L* value) of 18.5. The desorption percentage of the carbon black from the black magnetic composite particles was 7.5%. As to the magnetic properties, the coercive force value of the black magnetic composite particles was 61 Oe; the saturation magnetization value in a magnetic field of 10 kOe was 77.3 emu/g; and the residual magnetization value in a magnetic field of 10 kOe was 7.1 emu/g. The coating amount of an organosilane compound produced from methyl triethoxysilane was 0.31% by weight calculated as Si. The amount of the carbon black coat formed on the coating layer composed of the organosilane compound produced from methyl triethoxysilane is 8.19% by weight (calculated as C) based on the weight of the black magnetic composite particles (corresponding to 9 parts by weight based on 100 parts by weight of the spherical magnetite particles). The thickness of the carbon black coat formed was 0.0024 μm. Since no independent carbon black was observed on the electron micrograph of FIG. 3, it was determined that a whole amount of the carbon black used contributed to the formation of the carbon black coat on the coating layer composed of the organosilane compound produced from methyl triethoxysilane.

Example 2

<Production of Black Magnetic Toner Containing Black Magnetic Composite Particles>

400 g of the black magnetic composite particles obtained in Example 1, 540 g of styrene-butyl acrylate-methyl methacrylate copolymer resin (molecular weight=130,000, styrene/butyl acrylate/methyl methacrylate =82.0/16.5/1.5), 60 g of polypropylene wax (molecular weight: 3,000) and 15 g of a charge-controlling agent were charged into a Henschel mixer, and mixed and stirred therein at 60° C. for 15 minutes. The obtained mixed particles were melt-kneaded at 140° C. using a continuous-type twin-screw kneader (T-1), and the obtained kneaded material was cooled, coarsely pulverized and finely pulverized in air. The obtained particles were subjected to classification, thereby producing a black magnetic toner.

The obtained black magnetic toner had an average particle size of 9.7 μm, a dispersibility of 5th rank, a fluidity index of 73, a blackness (L* value) of 18.3, a volume resistivity of $1.0\times10^{14}$ Ω·cm, a coercive force value of 60 Oe, a saturation magnetization value (in a magnetic field of 10 kOe) of 32.6 emu/g, a residual magnetization value (in a magnetic field of 10 kOe) of 4.3 emu/g, a saturation magnetization value (in a magnetic field of 1 kOe) of 25.9 emu/g, and a residual magnetization value (in a magnetic field of 1 kOe) of 3.5 emu/g.

Example 3

<Production of Black Magnetic Composite Particles>

20 kg of spherical magnetite particles shown in the electron micrograph (×20,000) of FIG. 1 (average particle size: 0.23 μm; geometrical standard deviation value: 1.42; BET specific surface area value: 9.2 $m^2/g$; blackness (L* value): 20.6; fluidity index: 35; coercive force value: 61 Oe; saturation magnetization value in a magnetic field of 10 kOe: 84.9 emu/g; residual magnetization value in a magnetic field of 10 kOe: 7.8 emu/g), were deagglomerated in 150 liters of pure water using a stirrer, and further passed through a "TK pipeline homomixer" (tradename, manufactured by Tokushu Kika Kogyo Co., Ltd.) three times, thereby obtaining a slurry containing the spherical magnetite particles.

Successively, the obtained slurry containing the spherical magnetite particles was passed through a transverse-type sand grinder (tradename "MIGHTY MILL MHG-1.5L", manufactured by Inoue Seisakusho Co., Ltd.) five times at an axis-rotating speed of 2,000 rpm, thereby obtaining a slurry in which the spherical magnetite particles were dispersed.

The particles in the obtained slurry which remained on a sieve of 325 meshes (mesh size: 44 μm) was 0%. The slurry was filtered and washed with water, thereby obtaining a filter cake containing the spherical magnetite particles. After the obtained filter cake containing the spherical magnetite particles was dried at 120° C., 11.0 kg of the dried particles were then charged into an edge runner "MPUV-2 Model" (tradename, manufactured by Matsumoto Chuzo Tekkosho Co., Ltd.), and mixed and stirred at 30 Kg/cm and a stirring speed of 22 rpm for 30 minutes, thereby lightly deagglomerating the particles.

110 g of methyl hydrogen polysiloxane (tradename: "TSF484", produced by TOSHIBA SILICONE CO., LTD.) were added to the deagglomerated spherical magnetite particles under the operation of the edge runner. The spherical magnetite particles were continuously mixed and stirred at a linear load of 60 Kg/cm and a stirring speed of 22 rpm for 60 minutes to form a coating layer composed of methyl hydrogen polysiloxane on the spherical magnetite particles..

Next, 990 g of carbon black fine particles shown in the electron micrograph (×20,000) of FIG. 2 (particle shape: granular shape; average particle size: 0.022 μm; geometrical standard deviation value: 1.68; BET specific surface area value: 134 $m^2/g$; and blackness (L* value): 16.6) were added to the spherical magnetite particles coated with methyl hydrogen polysiloxane for 10 minutes while operating the edge runner. Further, the mixed particles were continuously stirred at a linear load of 60 Kg/cm and a stirring speed of 22 rpm for 60 minutes to form the carbon black coat on the coating layer composed of methyl hydrogen polysiloxane, thereby obtaining black magnetic composite particles.

The obtained black magnetic composite particles were dried at 105° C. for 60 minutes by using a drier to evaporate water or the like which were remained on surfaces of the composite particles. The obtained black magnetic composite particles had an average particle size of 0.24 μm. In addition, the black magnetic composite particles had a geometrical standard deviation value of 1.42, a BET specific surface area value of 9.8 $m^2/g$, a fluidity index of 48 and a blackness (L* value) of 18.2. The desorption percentage of the carbon black from the black magnetic composite particles was 6.5%. As to the magnetic properties, the coercive force value of the black magnetic composite particles was 59 Oe; the saturation magnetization value in a magnetic field of 10 kOe was 76.8 emu/g; and the residual magnetization value in a magnetic field of 10 kOe was 7.0 emu/g. The coating amount of methyl hydrogen polysiloxane was 0.44% by weight calculated as Si. The amount of the carbon black coat formed on the coating layer composed of methyl hydrogen polysiloxane is 8.21% by weight (calculated as C) based on the weight of the black magnetic composite particles (corresponding to 9 parts by weight based on 100 parts by weight of the spherical magnetite particles). The thickness of the carbon black coat formed was 0.0024 μm. Since no independent carbon black was observed on the electron micrograph, it was confirmed that a whole amount of the carbon black used contributed to the formation of the carbon black coat on the coating layer composed of methyl hydrogen polysiloxane.

Example 4

<Production of Black Magnetic Toner Containing Black Magnetic Composite Particles>

400 g of the black magnetic composite particles obtained in Example 3, 540 g of styrene-butyl acrylate-methyl methacrylate copolymer resin (molecular weight=130,000, styrene/butyl acrylate/methyl methacrylate =82.0/16.5/1.5), 60 g of polypropylene wax (molecular weight: 3,000) and 15 g of a charge-controlling agent were charged into a Henschel mixer, and mixed and stirred therein at 60° C. for 15 minutes. The obtained mixed particles were melt-kneaded at 140° C. using a continuous-type twin-screw kneader (T-1), and the obtained kneaded material was cooled, coarsely pulverized and finely pulverized in air. The obtained particles were subjected to classification, thereby producing a black magnetic toner.

The obtained black magnetic toner had an average particle size of 9.7 μm, a dispersibility of 5th rank, a fluidity index of 72, a blackness (L* value) of 18.1, a volume resistivity of $1.2\times10^{14}$ Ω·cm, a coercive force value of 59 Oe, a saturation magnetization value (in a magnetic field of 10 kOe) of 32.4 emu/g, a residual magnetization value (in a magnetic field of 10 kOe) of 4.1 emu/g, a saturation magnetization value (in a magnetic field of 1 kOe) of 25.7 emu/g, and a residual magnetization value (in a magnetic field of 1 kOe) of 3.4 emu/g.

Example 5

<Production of Black Magnetic Composite Particles>

20 kg of spherical magnetite particles shown in the electron micrograph (×20,000) of FIG. 1 (average particle size: 0.23 μm; geometrical standard deviation value: 1.42; BET specific surface area value: 9.2 $m^2/g$; blackness (L* value): 20.6; fluidity index: 35; coercive force value: 61 Oe; saturation magnetization value in a magnetic field of 10 kOe: 84.9 emu/g; residual magnetization value in a magnetic field of 10 kOe: 7.8 emu/g), were deagglomerated in 150 liters of pure water using a stirrer, and further passed through a "TK pipeline homomixer" (tradename, manufactured by Tokushu Kika Kogyo Co., Ltd.) three times, thereby obtaining a slurry containing the spherical magnetite particles.

Successively, the obtained slurry containing the spherical magnetite particles was passed through a transverse-type sand grinder (tradename "MIGHTY MILL MHG-1.5L", manufactured by Inoue Seisakusho Co., Ltd.) five times at an axis-rotating speed of 2,000 rpm, thereby obtaining a slurry in which the spherical magnetite particles were dispersed.

The particles in the obtained slurry which remained on a sieve of 325 meshes (mesh size: 44 μm) was 0%. The slurry was filtered and washed with water, thereby obtaining a filter cake containing the spherical magnetite particles. After the obtained filter cake containing the spherical magnetite particles was dried at 120° C., 11.0 kg of the dried particles were then charged into an edge runner "MPUV-2 Model" (tradename, manufactured by Matsumoto Chuzo Tekkosho Co., Ltd.), and mixed and stirred at 30 Kg/cm and a stirring speed of 22 rpm for 30 minutes, thereby lightly deagglomerating the particles.

220 g of tridecafluorooctyl trimethoxysilane (tradename "TSL8257", produced by TOSHIBA SILICONE CO., LTD.) were added to the deagglomerated spherical magnetite particles under the operation of the edge runner. The spherical magnetite particles were continuously mixed and stirred at a linear load of 60 Kg/cm and a stirring speed of 22 rpm for 60 minutes to form a coating layer composed of tridecafluorooctyl trimethoxysilane on the surface of the black manganese-containing hematite particles.

Next, 990 g of carbon black fine particles shown in the electron micrograph (×20,000) of FIG. 2 (particle shape: granular shape; average particle size: 0.022 μm; geometrical standard deviation value: 1.68; BET specific surface area value: 134 $m^2/g$; and blackness (L* value): 16.6) were added to the spherical magnetite particles coated with tridecafluorooctyl trimethoxysilane for 10 minutes while operating the edge runner. Further, the mixed particles were continuously stirred at a linear load of 60 Kg/cm and a stirring speed of 22 rpm for 60 minutes to form the carbon black coat on the coating layer composed of tridecafluorooctyl trimethoxysilane, thereby obtaining black magnetic composite particles.

The obtained black magnetic composite particles were heat-treated at 105° C. for 60 minutes by using a drier to evaporate water or the like which were remained on surfaces of the composite particles. The obtained black magnetic composite particles had an average particle size of 0.24 μm. In addition, the black magnetic composite particles showed a geometrical standard deviation value of 1.42, a BET specific surface area value of 8.6 $m^2/g$, a fluidity index of 48 and a blackness (L* value) of 18.4. The desorption percentage of the carbon black from the black magnetic composite particles was 6.8%. As to the magnetic properties, the coercive force value of the black magnetic composite particles was 61 Oe; the saturation magnetization value in a magnetic field of 10 kOe was 76.8 emu/g; and the residual magnetization value in a magnetic field of 10 kOe was 6.9 emu/g. The amount of a coating layer composed of a fluorine-containing organosilane compound produced from tridecafluorooctyl trimethoxysilane was 0.13% by weight calculated as Si. The amount of the carbon black coat formed on the coating layer composed of the fluoroalkyl organosilane compound produced from tridecafluorooctyl trimethoxysilane is 8.15% by weight (calculated as C) based on the weight of the black magnetic composite particles (corresponding to 9 parts by weight based on 100 parts by weight of the spherical magnetite particles). The thickness of the carbon black coat formed was 0.0024 μm. Since no independent carbon black was observed on the electron micrograph, it was confirmed that a whole amount of the carbon black used contributed to the formation of the carbon black coat on the coating layer composed of the fluorine-containing organosilane compound produced from tridecafluorooctyl trimethoxysilane.

Example 6

<Production of Black Magnetic Toner Containing Black Magnetic Composite Particles>

400 g of the black magnetic composite particles obtained in Example 5, 540 g of styrene-butyl acrylate-methyl methacrylate copolymer resin (molecular weight=130,000, styrene/butyl acrylate/methyl methacrylate =82.0/16.5/1.5), 60 g of polypropylene wax (molecular weight: 3,000) and 15 g of a charge-controlling agent were charged into a Henschel mixer, and mixed and stirred therein at 60° C. for 15 minutes. The obtained mixed particles were melt-kneaded at 140° C. using a continuous-type twin-screw kneader (T-1), and the obtained kneaded material was cooled, coarsely pulverized and finely pulverized in air. The obtained particles were subjected to classification, thereby producing a black magnetic toner.

The obtained black magnetic toner had an average particle size of 10.1 μm, a dispersibility of 5th rank, a fluidity index of 75, a blackness (L* value) of 18.5, a volume resistivity of $1.3\times10^{14}$ Ω·cm, a coercive force value of 58 Oe, a saturation magnetization value (in a magnetic field of 10 kOe) of 32.4 emu/g, a residual magnetization value (in a magnetic field of 10 kOe) of 4.2 emu/g, a saturation magnetization value (in a magnetic field of 1 kOe) of 25.7 emu/g, and a residual magnetization value (in a magnetic field of 1 kOe) of 3.4 emu/g.

Core Particles 1 to 4

Various magnetic iron oxide particles were prepared by known methods. The same procedure as defined in Example 1 was conducted by using the thus prepared particles, thereby obtaining deagglomerated magnetic iron oxide particles as core particles.

Various properties of the thus obtained magnetic iron oxide particles are shown in Table 1.

Core Particles 5

The same procedure as defined in Example 1 was conducted by using 20 kg of the deagglomerated octahedral magnetite particles (core particles 1) and 150 liters of water, thereby obtaining a slurry containing the octahedral magnetite particles. The pH value of the obtained re-dispersed slurry containing the octahedral magnetite particles was adjusted to 4.0, and then the concentration of the slurry was adjusted to 98 g/liter by adding water thereto. After 150 liters of the slurry was heated to 60° C., 2722 ml of a 1.0 mol/liter aluminum sulfate solution (equivalent to 1.0% by weight (calculated as Al) based on the weight of the octahedral magnetite particles) was added to the slurry. After allowing the slurry to stand for 30 minutes, the pH value of the slurry was adjusted to 7.5 by adding an aqueous sodium hydroxide solution. Successively, 254 g of water glass #3 (equivalent to 0.5% by weight (calculated as $SiO_2$) based on the weight of the octahedral magnetite particles) was added to the slurry. After the slurry was aged for 30 minutes, the pH value of the slurry was adjusted to 7.5 by adding acetic acid. After further allowing the slurry to stand for 30 minutes, the slurry was subjected to filtration, washing with water, drying and pulverization, thereby obtaining the octahedral magnetite particles coated with hydroxides of aluminum and oxides of silicon.

Main production conditions are shown in Table 2, and various properties of the obtained octahedral magnetite particles are shown in Table 3.

Core Particles 6 to 8

The same procedure as defined in the production of the core particles 5 above, was conducted except that kind of core particles, and kind and amount of additives used in the surface treatment were varied, thereby obtaining surface-treated magnetic iron oxide particles.

Main production conditions are shown in Table 2, and various properties of the obtained surface-treated magnetic iron oxide particles are shown in Table 3.

Examples 7 to 14 and Comparative Examples 1 to 5

The same procedure as defined in Example 1 was conducted except that kind of particles to be treated, addition or non-addition of an alkoxysilane compound in the coating treatment with alkoxysilane compound, kind and amount of the alkoxysilane compound added, treating conditions of edge runner in the coating treatment, kind and amount of carbon black coat formed, and treating conditions of edge runner used in the process for forming the carbon black coat, were varied, thereby obtaining black magnetic composite particles. The black magnetic composite particles obtained in Examples 7 to 14 were observed by an electron microscope. As a result, almost no independent carbon black was recognized. Therefore, it was confirmed that a substantially whole amount of the carbon black contributed to the formation of the carbon black coat on the coating layer composed of organosilane compound produced from the alkoxysilane compound.

Various properties of the carbon black fine particles A to C are shown in Table 4.

Main production conditions are shown in Table 5, and various properties of the obtained black magnetic composite particles are shown in Table 6.

Figure 4:
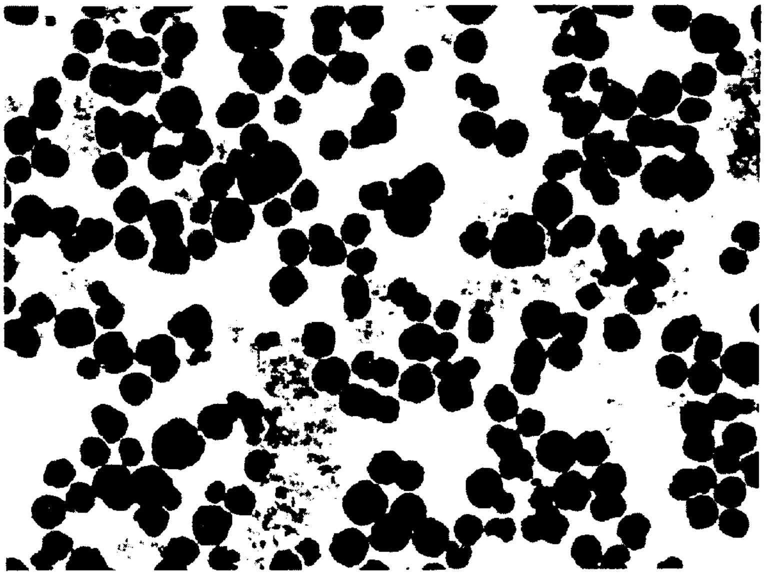
FIG. 4 is an electron micrograph (×20,000) showing a particle structure of mixed particles composed of the spherical magnetite particles and the carbon black fine particles, for comparative purpose.

Meanwhile, in Comparative Example 1, the spherical magnetite particles uncoated with the alkoxysilane compound and the carbon black fine particles were mixed and stirred together by an edge runner in the same manner as described above, thereby obtaining treated particles. An electron micrograph (×20,000) of the thus treated particles is shown in FIG. 4. As shown in FIG. 4, it was confirmed that the carbon black was not adhered on the surfaces of the spherical magnetite particles, and both the particles were present independently.

Examples 15 to 22 and Comparative Examples 6 to 14

<Production of Black Magnetic Toner>

The same procedure as defined in Example 2 was conducted by using the black magnetic composite particles obtained in Examples 7 to 14, the magnetic iron oxide particles as core particles 1 to 4, the mixed particles composed of the magnetic iron oxide particles and the carbon black fine particles used in Comparative Example 1 and the black magnetic composite particles obtained in Comparative Examples 2 to 5, thereby obtaining black magnetic toners.

Main production conditions and various properties of the obtained black magnetic toners are shown in Tables 7 and 8.

Examples 23 to 46 and Comparative Examples 15 to 23

The same procedure as defined in Example 3 was conducted except that kind of particles to be treated, addition or non-addition of a polysiloxane or modified polysiloxane, kind and amount of the polysiloxane or modified polysiloxane, treating conditions of edge runner in the coating treatment, kind and amount of carbon black coat formed, and treating conditions of edge runner used in the process for forming the carbon black coat, were varied, thereby obtaining black magnetic composite particles. The black magnetic composite particles obtained in Examples 23 to 46 were observed by an electron microscope. As a result, almost no independent carbon black was recognized. Therefore, it was confirmed that a substantially whole amount of the carbon black contributed to the formation of the carbon black coat on the coating layer composed of polysiloxane or modified polysiloxane.

Main production conditions are shown in Tables 9 to 11, and various properties of the obtained black magnetic composite particles are shown in Tables 12 to 14.

Examples 47 to 70 and Comparative Examples 24 to 32

<Production of Black Magnetic Toner>

The same procedure as defined in Example 4 was conducted by using the black magnetic composite particles obtained in Examples 47 to 70, and the black magnetic composite particles obtained in Comparative Examples 15 to 23, thereby obtaining black magnetic toners.

Main production conditions and various properties of the obtained black magnetic toners are shown in Tables 15 to 17.

Examples 71 to 78 and Comparative Examples 33 to 35

The same procedure as defined in Example 5 was conducted except that kind of particles to be treated, addition or non-addition of a fluoroalkyl organosilane compound, kind and amount of the fluoroalkyl organosilane compound added, treating conditions of edge runner in the coating treatment, kind and amount of carbon black coat formed, and treating conditions of edge runner used in the process for forming the carbon black coat, were varied, thereby obtaining black magnetic composite particles. The black magnetic composite particles obtained in Examples 71 to 78 were observed by an electron microscope. As a result, almost no independent carbon black was recognized. Therefore, it was confirmed that a substantially whole amount of the carbon black contributed to the formation of the carbon black coat on the coating layer composed of a fluorine-containing organosilane compound produced from the fluoroalkyl organosilane compound.

Main production conditions are shown in Table 18, and various properties of the obtained black magnetic composite particles are shown in Table 19.

Examples 79 to 86 and Comparative Examples 36 to 38

<Production of Black Magnetic Toner>

The same procedure as defined in Example 6 was conducted by using the black magnetic composite particles obtained in Examples 71 to 78, and the black magnetic composite particles obtained in Comparative Examples 33 to 35, thereby obtaining black magnetic toners.

Main production conditions and various properties of the obtained black magnetic toners are shown in Table 20.

TABLE 1

| Core particles | Properties of magnetic iron oxide particles: Kind | Particle shape | Average particle size (μm) | Aspect ratio (-) | Geometrical standard deviation (-) |
|---|---|---|---|---|---|
| Core particles 1 | Magnetite particles | Octahedral | 0.28 | — | 1.53 |
| Core particles 2 | Magnetite particles | Spherical | 0.23 | — | 1.35 |
| Core particles 3 | Magnetite particles | Acicular | 0.40 | 8.1:1 | 1.53 |
| Core particles 4 | Maghemite particles | Spherical | 0.20 | — | 1.42 |

| Core particles | Properties of magnetic iron oxide particles: BET specific surface area ($m^2/g$) | Magnetic properties: Coercive force (Oe) | Saturation magnetization (10 kOe) (emu/g) | Residual magnetization (10 kOe) (emu/g) | Fluidity index (-) | Blackness (L* value) (-) |
|---|---|---|---|---|---|---|
| Core particles 1 | 4.6 | 101 | 86.8 | 12.2 | 34 | 20.3 |
| Core particles 2 | 11.8 | 63 | 85.1 | 7.7 | 38 | 20.1 |
| Core particles 3 | 18.8 | 343 | 86.3 | 29.3 | 32 | 23.8 |
| Core particles 4 | 7.2 | 54 | 78.8 | 8.7 | 38 | 31.5 |

TABLE 2

| Core particles | Kind of core particles | Surface-treating process Additives: Kind | Calculated as | Amount (wt. %) |
|---|---|---|---|---|
| Core particles 5 | Core particles 1 | Aluminum sulfate<br>Water glass #3 | Al<br>$SiO_2$ | 1.0<br>0.5 |
| Core particles 6 | Core particles 2 | Sodium aluminate<br>Colloidal silica | Al<br>$SiO_2$ | 2.0<br>1.0 |
| Core particles 7 | Core particles 3 | Aluminum acetate | Al | 5.0 |
| Core particles 8 | Core particles 4 | Water glass #3 | $SiO_2$ | 1.0 |

| Core particles | Surface-treating process Coating material: Kind | Calculated as | Amount (wt. %) |
|---|---|---|---|
| Core particles 5 | A | Al | 0.98 |
| | S | $SiO_2$ | 0.49 |
| Core particles 6 | A | Al | 1.92 |
| | S | $SiO_2$ | 0.96 |
| Core particles 7 | A | Al | 4.75 |
| Core particles 8 | S | $SiO_2$ | 0.98 |

Note; A: Hydroxide of aluminum
S: Oxide of silicon

TABLE 3

| Core particles | Properties of surface-treated magnetic iron oxide particles: Average particle size (μm) | Aspect ratio (-) | Geometrical standard deviation (-) | BET specific surface area ($m^2/g$) |
|---|---|---|---|---|
| Core particles 5 | 0.29 | — | 1.51 | 9.8 |
| Core particles 6 | 0.24 | — | 1.35 | 13.6 |
| Core particles 7 | 0.40 | 8.1:1 | 1.52 | 25.4 |
| Core particles 8 | 0.20 | — | 1.42 | 7.5 |

| Core particles | Properties of surface-treated magnetic iron oxide particles, Magnetic properties: Coercive force (Oe) | Saturation magnetization (10 kOe) (emu/g) | Residual magnetization (10 kOe) (emu/g) | Fluidity index (-) | Blackness (L* value) (-) |
|---|---|---|---|---|---|
| Core particles 5 | 103 | 86.3 | 12.1 | 32 | 21.4 |

TABLE 3-continued

| | | | | | |
|---|---|---|---|---|---|
| Core particles 6 | 62 | 84.8 | 7.6 | 37 | 20.8 |
| Core particles 7 | 336 | 86.0 | 19.8 | 32 | 24.6 |
| Core particles 8 | 53 | 78.6 | 8.6 | 37 | 31.6 |

TABLE 4

| Kind of carbon black fine particles | Properties of carbon black fine particles: Particle shape | Average particle size ($\mu$m) | Geometrical standard deviation (–) |
|---|---|---|---|
| Carbon black A | Granular | 0.022 | 1.78 |
| Carbon black B | Granular | 0.015 | 1.56 |
| Carbon black C | Granular | 0.030 | 2.06 |

| Kind of carbon black fine particles | Properties of carbon black fine particles: BET specific surface area ($m^2/g$) | Blackness (L* value) (–) |
|---|---|---|
| Carbon black A | 133.5 | 14.6 |
| Carbon black B | 265.3 | 15.2 |
| Carbon black C | 84.6 | 17.0 |

TABLE 5

| Examples and Comparative Examples | Kind of particles to be treated | Production of black magnetic composite particles / Coating step with alkoxysilane or silicon compound / Alkoxysilane compound: Kind | Amount added (part by weight) |
|---|---|---|---|
| Example 7 | Core particles 1 | Dimethyl dimethoxysilane | 1.0 |
| Example 8 | Core particles 2 | Phenyl triethoxysilane | 0.5 |
| Example 9 | Core particles 3 | Isobutyl trimethoxysilane | 5.0 |
| Example 10 | Core particles 4 | Methyl triethoxysilane | 1.5 |
| Example 11 | Core particles 5 | Dimethyl dimethoxysilane | 0.2 |
| Example 12 | Core particles 6 | Phenyl triethoxysilane | 1.5 |
| Example 13 | Core particles 7 | Isobutyl trimethoxysilane | 1.0 |
| Example 14 | Core particles 8 | Methyl triethoxysilane | 2.0 |
| Comparative Example 1 | Core particles used in Example 1 | — | — |
| Comparative Example 2 | Core particles 1 | Methyl triethoxysilane | 1.0 |
| Comparative Example 3 | Core particles 1 | Dimethyl dimethoxysilane | 0.5 |
| Comparative Example 4 | Core particles 1 | Methyl triethoxysilane | 0.005 |

TABLE 5-continued

| | | | |
|---|---|---|---|
| Comparative Example 5 | Core particles 1 | $\gamma$-aminopropyl triethoxysilane | 1.0 |

| Examples and Comparative Examples | Production of black magnetic composite particles / Coating step with alkoxysilane or silicon compound / Edge runner treatment: Linear load (Kg/cm) | Time (min) | Coating amount (calculated as Si) (wt. %) |
|---|---|---|---|
| Example 7 | 45 | 15 | 0.22 |
| Example 8 | 75 | 20 | 0.06 |
| Example 9 | 30 | 60 | 0.73 |
| Example 10 | 60 | 30 | 0.24 |
| Example 11 | 60 | 20 | 0.05 |
| Example 12 | 30 | 60 | 0.18 |
| Example 13 | 45 | 30 | 0.16 |
| Example 14 | 60 | 30 | 0.32 |
| Comparative Example 1 | — | — | — |
| Comparative Example 2 | 30 | 60 | 0.21 |
| Comparative Example 3 | 60 | 30 | 0.11 |
| Comparative Example 4 | 60 | 30 | $7.9 \times 10^{-4}$ |
| Comparative Example 5 | 60 | 60 | 0.126 |

| Examples and Comparative Examples | Production of black magnetic composite particles / Adhering step of carbon black / Carbon black fine particles: Kind | Amount added (part by weight) |
|---|---|---|
| Example 7 | B | 6.0 |
| Example 8 | B | 12.0 |
| Example 9 | C | 16.0 |
| Example 10 | A | 25.0 |
| Example 11 | B | 20.0 |
| Example 12 | B | 15.0 |
| Example 13 | C | 10.0 |
| Example 14 | A | 20.0 |
| Comparative Example 1 | Carbon black fine particles used in Example 1 | 10.0 |
| Comparative Example 2 | — | — |
| Comparative Example 3 | A | 0.01 |
| Comparative Example 4 | B | 5.0 |
| Comparative Example 5 | C | 7.0 |

| Examples and Comparative Examples | Production of black magnetic composite particles / Adhering step of carbon black / Edge runner treatment: Linear load (Kg/cm) | Time (min) | Amount adhered (calculated as C) (wt. %) |
|---|---|---|---|
| Example 7 | 30 | 60 | 5.66 |
| Example 8 | 30 | 90 | 10.73 |
| Example 9 | 45 | 45 | 13.70 |
| Example 10 | 60 | 60 | 22.65 |
| Example 11 | 30 | 45 | 16.63 |
| Example 12 | 60 | 60 | 12.99 |
| Example 13 | 60 | 30 | 9.09 |
| Example 14 | 75 | 30 | 17.09 |

TABLE 5-continued

| | | | |
|---|---|---|---|
| Comparative Example 1 | 60 | 30 | 9.06 |
| Comparative Example 2 | — | — | — |
| Comparative Example 3 | 30 | 60 | 0.01 |
| Comparative Example 4 | 60 | 45 | 4.75 |
| Comparative Example 5 | 60 | 30 | 2.88 |

TABLE 6

| Examples and Comparative Examples | Properties of black magnetic composite particles: Average particle size (μm) | Aspect ratio (–) | Geometrical standard deviation (–) | BET specific surface area ($m^2/g$) |
|---|---|---|---|---|
| Example 7 | 0.28 | – | 1.52 | 5.0 |
| Example 8 | 0.24 | – | 1.34 | 13.6 |
| Example 9 | 0.41 | 8.1:1 | 1.51 | 23.8 |
| Example 10 | 0.23 | – | 1.43 | 15.3 |
| Example 11 | 0.30 | – | 1.47 | 14.4 |
| Example 12 | 0.24 | – | 1.34 | 16.1 |
| Example 13 | 0.40 | 8.0:1 | 1.50 | 24.8 |
| Example 14 | 0.23 | – | 1.42 | 13.8 |
| Comparative Example 1 | 0.29 | – | 1.53 | 11.9 |
| Comparative Example 2 | 0.29 | – | 1.52 | 10.6 |
| Comparative Example 3 | 0.28 | – | 1.52 | 5.6 |
| Comparative Example 4 | 0.28 | – | 1.52 | 17.6 |
| Comparative Example 5 | 0.29 | – | 1.52 | 11.2 |

| Examples and Comparative Examples | Properties of black magnetic composite particles, Magnetic properties: Coercive force (Oe) | Saturation magnetization (10 kOe) (emu/g) | Residual magnetization (10 kOe) (emu/g) |
|---|---|---|---|
| Example 7 | 108 | 81.1 | 11.4 |
| Example 8 | 65 | 71.8 | 6.5 |
| Example 9 | 336 | 73.8 | 25.8 |
| Example 10 | 58 | 63.6 | 6.4 |
| Example 11 | 106 | 72.8 | 10.2 |
| Example 12 | 68 | 74.1 | 6.7 |
| Example 13 | 331 | 77.8 | 27.2 |
| Example 14 | 57 | 65.6 | 7.2 |
| Comparative Example 1 | 103 | 79.3 | 10.3 |
| Comparative Example 2 | 103 | 83.6 | 10.8 |
| Comparative Example 3 | 104 | 86.7 | 11.3 |
| Comparative Example 4 | 100 | 83.8 | 10.9 |
| Comparative Example 5 | 102 | 84.6 | 10.6 |

TABLE 6-continued

| Examples and Comparative Examples | Properties of black magnetic composite particles: Fluidity index (–) | Blackness (L* value) (–) | Carbon black desorption percentage (%) | Thickness of carbon black coat (μm) |
|---|---|---|---|---|
| Example 7 | 49 | 17.0 | 8.6 | 0.0023 |
| Example 8 | 45 | 16.4 | 8.2 | 0.0024 |
| Example 9 | 46 | 17.8 | 6.4 | 0.0026 |
| Example 10 | 54 | 17.5 | 5.2 | 0.0027 |
| Example 11 | 52 | 15.9 | 3.1 | 0.0027 |
| Example 12 | 47 | 16.2 | 3.6 | 0.0025 |
| Example 13 | 48 | 17.5 | 2.1 | 0.0024 |
| Example 14 | 51 | 17.9 | 3.8 | 0.0026 |
| Comparative Example 1 | 42 | 20.0 | 78.6 | — |
| Comparative Example 2 | 40 | 20.9 | — | — |
| Comparative Example 3 | 38 | 21.4 | 31.2 | — |
| Comparative Example 4 | 40 | 20.1 | 26.5 | — |
| Comparative Example 5 | 41 | 20.6 | 41.6 | — |

TABLE 7

| Examples | Production of black magnetic toner: Black magnetic composite particles: Kind | Amount blended (part by weight) | Resin: Kind | Amount blended (part by weight) |
|---|---|---|---|---|
| Example 15 | Example 7 | 45 | Styrene-acryl copolymer resin | 55 |
| Example 16 | Example 8 | 45 | Styrene-acryl copolymer resin | 55 |
| Example 17 | Example 9 | 40 | Styrene-acryl copolymer resin | 60 |
| Example 18 | Example 10 | 50 | Styrene-acryl copolymer resin | 50 |
| Example 19 | Example 11 | 45 | Styrene-acryl copolymer resin | 55 |
| Example 20 | Example 12 | 40 | Styrene-acryl copolymer resin | 60 |
| Example 21 | Example 13 | 50 | Styrene-acryl copolymer resin | 50 |
| Example 22 | Example 14 | 50 | Styrene-acryl copolymer resin | 50 |

| Examples | Properties of black magnetic toner: Average particle size (μm) | Dispers-ibility (–) | Fluidity index (–) | Volume resistivity (Ω· cm) |
|---|---|---|---|---|
| Example 15 | 9.6 | 4 | 74 | $9.8 \times 10^{13}$ |
| Example 16 | 10.1 | 5 | 82 | $1.6 \times 10^{14}$ |
| Example 17 | 11.2 | 4 | 72 | $7.3 \times 10^{13}$ |
| Example 18 | 10.6 | 5 | 78 | $8.6 \times 10^{13}$ |

TABLE 7-continued

| | | | | |
|---|---|---|---|---|
| Example 19 | 9.2 | 5 | 78 | $6.8 \times 10^{13}$ |
| Example 20 | 9.8 | 5 | 86 | $2.6 \times 10^{14}$ |
| Example 21 | 8.9 | 5 | 73 | $1.8 \times 10^{14}$ |
| Example 22 | 11.0 | 5 | 82 | $1.1 \times 10^{14}$ |

| | Properties of black magnetic toner Magnetic properties | | |
|---|---|---|---|
| | Coercive | Saturation magnetization | |
| Examples | force (Oe) | (10 kOe) (emu/g) | (1 kOe) (emu/g) |
| Example 15 | 96 | 36.8 | 27.6 |
| Example 16 | 61 | 33.6 | 26.1 |
| Example 17 | 311 | 31.4 | 23.4 |
| Example 18 | 56 | 32.3 | 22.7 |
| Example 19 | 103 | 32.3 | 23.6 |
| Example 20 | 66 | 29.6 | 22.2 |
| Example 21 | 320 | 39.1 | 29.7 |
| Example 22 | 53 | 31.9 | 23.9 |

| | Properties of black magnetic toner | | |
|---|---|---|---|
| | Magnetic properties Residual magnetization | | Blackness |
| Examples | (10 kOe) (emu/g) | (1 kOe) (emu/g) | (L* value) (−) |
| Example 15 | 5.9 | 4.4 | 18.7 |
| Example 16 | 4.0 | 2.9 | 18.1 |
| Example 17 | 11.3 | 8.5 | 19.6 |
| Example 18 | 4.5 | 3.2 | 19.2 |
| Example 19 | 5.2 | 4.0 | 17.4 |
| Example 20 | 3.6 | 2.7 | 18.1 |
| Example 21 | 14.1 | 9.9 | 18.9 |
| Example 22 | 4.5 | 3.1 | 19.5 |

TABLE 8

| | Production of black magnetic toner | | | |
|---|---|---|---|---|
| | Black magnetic particles | | Resin | |
| Comparative Examples | Kind | Amount blended (part by weight) | Kind | Amount blended (part by weight) |
| Comparative Example 6 | Core particles 1 | 45 | Styrene-acryl copolymer resin | 55 |
| Comparative Example 7 | Core particles 2 | 45 | Styrene-acryl copolymer resin | 55 |
| Comparative Example 8 | Core particles 3 | 45 | Styrene-acryl copolymer resin | 55 |
| Comparative Example 9 | Core particles 4 | 45 | Styrene-acryl copolymer resin | 55 |
| Comparative Example 10 | Comparative Example 1 | 45 | Styrene-acryl copolymer resin | 55 |
| Comparative Example 11 | Comparative Example 2 | 45 | Styrene-acryl copolymer resin | 55 |

TABLE 8-continued

| | | | | |
|---|---|---|---|---|
| Comparative Example 12 | Comparative Example 3 | 45 | Styrene-acryl copolymer resin | 55 |
| Comparative Example 13 | Comparative Example 4 | 45 | Styrene-acryl copolymer resin | 55 |
| Comparative Example 14 | Comparative Example 5 | 45 | Styrene-acryl copolymer resin | 55 |

| | Properties of black magnetic toner | | | |
|---|---|---|---|---|
| Comparative Examples | Average particle size (μm) | Dispers-ibility (−) | Fluidity index (−) | Volume resistivity (Ω· cm) |
| Comparative Example 6 | 10.0 | 3 | 60 | $6.3 \times 10^{12}$ |
| Comparative Example 7 | 10.1 | 3 | 65 | $5.4 \times 10^{12}$ |
| Comparative Example 8 | 9.8 | 3 | 58 | $9.1 \times 10^{11}$ |
| Comparative Example 9 | 10.3 | 3 | 63 | $3.2 \times 10^{12}$ |
| Comparative Example 10 | 11.0 | 2 | 55 | $3.6 \times 10^{11}$ |
| Comparative Example 11 | 10.6 | 2 | 58 | $1.6 \times 10^{12}$ |
| Comparative Example 12 | 10.8 | 3 | 61 | $1.6 \times 10^{12}$ |
| Comparative Example 13 | 10.4 | 2 | 58 | $2.6 \times 10^{12}$ |
| Comparative Example 14 | 10.4 | 2 | 57 | $2.6 \times 10^{12}$ |

| | Properties of black magnetic toner Magnetic properties | | |
|---|---|---|---|
| | Coercive | Saturation magnetization | |
| Comparative Examples | force (Oe) | (10 kOe) (emu/g) | (1 kOe) (emu/g) |
| Comparative Example 6 | 104 | 39.6 | 30.0 |
| Comparative Example 7 | 61 | 38.8 | 29.1 |
| Comparative Example 8 | 338 | 37.6 | 28.8 |
| Comparative Example 9 | 51 | 34.6 | 26.0 |
| Comparative Example 10 | 99 | 35.6 | 26.3 |
| Comparative Example 11 | 100 | 39.1 | 27.1 |
| Comparative Example 12 | 103 | 38.1 | 29.3 |
| Comparative Example 13 | 102 | 36.7 | 28.6 |
| Comparative Example 14 | 102 | 36.3 | 27.8 |

| | Properties of black magnetic toner | | |
|---|---|---|---|
| | Magnetic properties Residual magnetization | | Blackness |
| Comparative Examples | (10 kOe) (emu/g) | (1 kOe) (emu/g) | (L* value) (−) |
| Comparative Example 6 | 5.5 | 4.2 | 22.3 |
| Comparative Example 7 | 3.5 | 2.6 | 22.1 |

TABLE 8-continued

| | | | |
|---|---|---|---|
| Comparative Example 8 | 12.8 | 9.7 | 26.0 |
| Comparative Example 9 | 3.8 | 3.0 | 34.8 |
| Comparative Example 10 | 5.0 | 3.7 | 22.6 |
| Comparative Example 11 | 5.9 | 4.6 | 23.3 |
| Comparative Example 12 | 5.3 | 4.1 | 23.5 |
| Comparative Example 13 | 5.1 | 3.9 | 22.3 |
| Comparative Example 14 | 4.9 | 3.8 | 22.1 |

TABLE 9

| | | Production of black magnetic composite particles Coating step with polysiloxane Polysiloxane | |
|---|---|---|---|
| Examples and Comparative Examples | Kind of particles to be treated | Kind | Amount added (part by weight) |
| Example 23 | Core particles 1 | TSF484 | 1.0 |
| Example 24 | Core particles 2 | TSF484 | 5.0 |
| Example 25 | Core particles 3 | KF99 | 2.0 |
| Example 26 | Core particles 4 | L-9000 | 1.0 |
| Example 27 | Core particles 5 | TSF451 | 1.5 |
| Example 28 | Core particles 6 | TSF484 | 3.5 |
| Example 29 | Core particles 7 | KF99 | 1.0 |
| Example 30 | Core particles 8 | L-9000 | 2.0 |
| Comparative Example 15 | Core particles 1 | TSF484 | 1.0 |
| Comparative Example 16 | Core particles 1 | TSF484 | 0.5 |
| Comparative Example 17 | Core particles 1 | TSF484 | 0.005 |

| Examples and Comparative Examples | Production of black magnetic composite particles Coating step with polysiloxane Edge runner treatment Linear load (Kg/cm) | Time (min) | Coating amount (calculated as Si) (wt. %) |
|---|---|---|---|
| Example 23 | 60 | 30 | 0.44 |
| Example 24 | 45 | 25 | 2.18 |
| Example 25 | 30 | 30 | 0.87 |
| Example 26 | 60 | 45 | 0.44 |
| Example 27 | 45 | 60 | 0.62 |
| Example 28 | 60 | 30 | 1.50 |
| Example 29 | 75 | 25 | 0.43 |
| Example 30 | 60 | 20 | 0.87 |
| Comparative Example 15 | 60 | 30 | 0.44 |
| Comparative Example 16 | 60 | 30 | 0.21 |
| Comparative Example 17 | 60 | 30 | $2.2 \times 10^{-3}$ |

TABLE 9-continued

| Examples and Comparative Examples | Production of black magnetic composite particles Adhering step of carbon black Carbon black fine particles Kind | Amount added (part by weight) |
|---|---|---|
| Example 23 | A | 10.0 |
| Example 24 | A | 3.0 |
| Example 25 | B | 5.0 |
| Example 26 | C | 10.0 |
| Example 27 | A | 5.0 |
| Example 28 | A | 10.0 |
| Example 29 | B | 15.0 |
| Example 30 | C | 10.0 |
| Comparative Example 15 | — | — |
| Comparative Example 16 | A | 0.01 |
| Comparative Example 17 | B | 3.0 |

| Examples and Comparative Examples | Production of black magnetic composite particles Adhering step of carbon black Edge runner treatment Linear load (Kg/cm) | Time (min) | Amount adhered (calculated as C) (wt. %) |
|---|---|---|---|
| Example 23 | 60 | 30 | 9.05 |
| Example 24 | 60 | 45 | 2.89 |
| Example 25 | 60 | 30 | 4.76 |
| Example 26 | 45 | 45 | 9.12 |
| Example 27 | 45 | 30 | 4.72 |
| Example 28 | 30 | 60 | 8.99 |
| Example 29 | 60 | 30 | 12.89 |
| Example 30 | 45 | 25 | 9.08 |
| Comparative Example 15 | — | — | — |
| Comparative Example 16 | 60 | 30 | 0.01 |
| Comparative Example 17 | 60 | 30 | 2.91 |

TABLE 10

| | | Production of black magnetic composite particles Coating step with modified polysiloxane Modified polysiloxane | |
|---|---|---|---|
| Examples and Comparative Examples | Kind of particles to be treated | Kind | Amount added (part by weight) |
| Example 31 | Core particles 1 | BYK-080 | 1.0 |
| Example 32 | Core particles 2 | BYK-080 | 0.5 |
| Example 33 | Core particles 3 | BYK-310 | 2.0 |
| Example 34 | Core particles 4 | BYK-322 | 5.0 |
| Example 35 | Core particles 5 | BYK-080 | 2.0 |
| Example 36 | Core particles 6 | BYK-080 | 3.0 |
| Example 37 | Core particles 7 | BYK-310 | 1.5 |

TABLE 10-continued

| Examples and Comparative Examples | Kind of particles to be treated | Kind | Amount added (part by weight) |
|---|---|---|---|
| Example 38 | Core particles 8 | BYK-322 | 7.0 |
| Comparative Example 18 | Core particles 1 | BYK-080 | 1.0 |
| Comparative Example 19 | Core particles 1 | BYK-080 | 0.5 |
| Comparative Example 20 | Core particles 1 | BYK-080 | 0.005 |

| Examples and Comparative Examples | Production of black magnetic composite particles Coating step with modified polysiloxane Edge runner treatment Linear load (Kg/cm) | Time (min) | Coating amount (calculated as Si) (wt. %) |
|---|---|---|---|
| Example 31 | 60 | 60 | 0.18 |
| Example 32 | 30 | 60 | 0.08 |
| Example 33 | 60 | 45 | 0.36 |
| Example 34 | 30 | 30 | 0.87 |
| Example 35 | 45 | 30 | 0.36 |
| Example 36 | 45 | 45 | 0.49 |
| Example 37 | 60 | 30 | 0.25 |
| Example 38 | 30 | 45 | 1.20 |
| Comparative Example 18 | 60 | 30 | 0.16 |
| Comparative Example 19 | 60 | 30 | 0.08 |
| Comparative Example 20 | 60 | 30 | $8.0 \times 10^{-4}$ |

| Examples and Comparative Examples | Production of black magnetic composite particles Adhering step of carbon black Carbon black fine particles Kind | Amount added (part by weight) |
|---|---|---|
| Example 31 | A | 8.0 |
| Example 32 | A | 6.0 |
| Example 33 | B | 6.5 |
| Example 34 | C | 11.5 |
| Example 35 | A | 7.5 |
| Example 36 | A | 12.5 |
| Example 37 | B | 18.0 |
| Example 38 | C | 15.0 |
| Comparative Example 18 | — | — |
| Comparative Example 19 | A | 0.01 |
| Comparative Example 20 | B | 5.0 |

| Examples and Comparative Examples | Production of black magnetic composite particles Adhering step of carbon black Edge runner treatment Linear load (Kg/cm) | Time (min) | Amount adhered (calculated as C) (wt. %) |
|---|---|---|---|
| Example 31 | 60 | 30 | 7.43 |
| Example 32 | 30 | 25 | 5.68 |
| Example 33 | 30 | 30 | 6.10 |
| Example 34 | 60 | 20 | 10.24 |
| Example 35 | 45 | 45 | 6.98 |
| Example 36 | 60 | 30 | 11.10 |
| Example 37 | 30 | 25 | 15.16 |
| Example 38 | 45 | 40 | 13.10 |
| Comparative Example 18 | — | — | — |
| Comparative Example 19 | 60 | 30 | 0.01 |
| Comparative Example 20 | 60 | 30 | 4.75 |

TABLE 11

| Examples and Comparative Examples | Production of black magnetic composite particles Coating step with terminal-modified polysiloxane Terminal-modified polysiloxane Kind of particles to be treated | Kind | Amount added (part by weight) |
|---|---|---|---|
| Example 39 | Core particles 1 | TSF4770 | 2.0 |
| Example 40 | Core particles 2 | TSF4770 | 1.0 |
| Example 41 | Core particles 3 | TSF4751 | 0.5 |
| Example 42 | Core particles 4 | TSF4751 | 3.0 |
| Example 43 | Core particles 5 | TSF4770 | 1.0 |
| Example 44 | Core particles 6 | TSF4770 | 3.0 |
| Example 45 | Core particles 7 | TSF4751 | 0.5 |
| Example 46 | Core particles 8 | TSF4751 | 1.7 |
| Comparative Example 21 | Core particles 1 | TSF4770 | 1.0 |
| Comparative Example 22 | Core particles 1 | TSF4770 | 1.0 |
| Comparative Example 23 | Core particles 1 | TSF4770 | 0.005 |

| Examples and Comparative Examples | Production of black magnetic composite particles Coating step with terminal-modified polysiloxane Edge runner treatment Linear load (Kg/cm) | Time (min) | Coating amount (calculated as Si) (wt. %) |
|---|---|---|---|
| Example 39 | 60 | 30 | 0.46 |
| Example 40 | 30 | 40 | 0.21 |
| Example 41 | 60 | 30 | 0.12 |
| Example 42 | 30 | 45 | 0.71 |
| Example 43 | 45 | 20 | 0.21 |
| Example 44 | 60 | 30 | 0.69 |
| Example 45 | 45 | 20 | 0.14 |
| Example 46 | 30 | 30 | 0.37 |
| Comparative Example 21 | 60 | 30 | 0.26 |
| Comparative Example 22 | 60 | 30 | 0.25 |
| Comparative Example 23 | 60 | 30 | $1.2 \times 10^{-3}$ |

| Examples and Comparative Examples | Production of black magnetic composite particles Adhering step of carbon black Carbon black fine particles Kind | Amount added (part by weight) |
|---|---|---|
| Example 39 | A | 10.0 |
| Example 40 | A | 6.0 |

TABLE 11-continued

| | | |
|---|---|---|
| Example 41 | B | 8.0 |
| Example 42 | C | 10.0 |
| Example 43 | A | 7.5 |
| Example 44 | A | 12.0 |
| Example 45 | B | 19.0 |
| Example 46 | C | 13.0 |
| Comparative Example 21 | — | — |
| Comparative Example 22 | A | 0.01 |
| Comparative Example 23 | B | 5.0 |

| Examples and Comparative Examples | Production of black magnetic composite particles Adhering step of carbon black | | |
|---|---|---|---|
| | Edge runner treatment | | Amount adhered (calculated as C) (wt. %) |
| | Linear load (Kg/cm) | Time (min) | |
| Example 39 | 60 | 30 | 9.13 |
| Example 40 | 30 | 45 | 5.57 |
| Example 41 | 45 | 60 | 7.42 |
| Example 42 | 60 | 45 | 9.10 |
| Example 43 | 30 | 30 | 6.98 |
| Example 44 | 45 | 25 | 10.70 |
| Example 45 | 60 | 45 | 15.15 |
| Example 46 | 30 | 30 | 11.43 |
| Comparative Example 21 | — | — | — |
| Comparative Example 22 | 60 | 30 | 0.01 |
| Comparative Example 23 | 60 | 30 | 4.73 |

TABLE 12

| Examples and Comparative Examples | Properties of black magnetic composite particles | | | |
|---|---|---|---|---|
| | Average particle size (μm) | Aspect ratio (—) | Geometrical standard deviation (—) | BET specific surface area ($m^2/g$) |
| Example 23 | 0.28 | — | 1.52 | 6.1 |
| Example 24 | 0.24 | — | 1.34 | 12.8 |
| Example 25 | 0.41 | 8.1:1 | 1.51 | 24.6 |
| Example 26 | 0.23 | — | 1.42 | 14.6 |
| Example 27 | 0.29 | — | 1.50 | 14.3 |
| Example 28 | 0.23 | — | 1.34 | 15.1 |
| Example 29 | 0.40 | 8.1:1 | 1.50 | 24.8 |
| Example 30 | 0.23 | — | 1.42 | 12.8 |
| Comparative Example 15 | 0.29 | — | 1.53 | 11.5 |
| Comparative Example 16 | 0.28 | — | 1.53 | 7.1 |
| Comparative Example 17 | 0.28 | — | 1.53 | 15.6 |

| Examples and Comparative Examples | Properties of black magnetic composite particles Magnetic properties | | |
|---|---|---|---|
| | Coercive force (Oe) | Saturation magnetization (10 kOe) (emu/g) | Residual magnetization (10 kOe) (emu/g) |
| Example 23 | 108 | 80.8 | 11.0 |
| Example 24 | 64 | 71.6 | 6.6 |
| Example 25 | 338 | 75.2 | 25.8 |
| Example 26 | 56 | 64.1 | 6.3 |

TABLE 12-continued

| | | | |
|---|---|---|---|
| Example 27 | 105 | 73.1 | 10.1 |
| Example 28 | 65 | 75.0 | 6.3 |
| Example 29 | 336 | 77.6 | 26.5 |
| Example 30 | 58 | 65.1 | 6.8 |
| Comparative Example 15 | 103 | 78.6 | 10.1 |
| Comparative Example 16 | 104 | 83.6 | 10.9 |
| Comparative Example 17 | 103 | 83.2 | 10.6 |

| Examples and Comparative Examples | Properties of black magnetic composite particles | | | |
|---|---|---|---|---|
| | Fluidity index (—) | Blackness (L* value) (—) | Carbon black desorption percentage (%) | Thickness of carbon black Coat (μm) |
| Example 23 | 51 | 17.0 | 7.2 | 0.0024 |
| Example 24 | 48 | 16.5 | 8.6 | 0.0021 |
| Example 25 | 46 | 17.2 | 8.8 | 0.0022 |
| Example 26 | 53 | 17.4 | 6.2 | 0.0024 |
| Example 27 | 50 | 15.3 | 4.6 | 0.0022 |
| Example 28 | 48 | 16.0 | 3.6 | 0.0025 |
| Example 29 | 49 | 17.6 | 1.8 | 0.0026 |
| Example 30 | 51 | 17.6 | 3.2 | 0.0024 |
| Comparative Example 15 | 39 | 20.6 | 60.5 | — |
| Comparative Example 16 | 39 | 21.0 | 28.3 | — |
| Comparative Example 17 | 40 | 20.8 | 43.8 | — |

TABLE 13

| Examples and Comparative Examples | Properties of black magnetic composite particles | | | |
|---|---|---|---|---|
| | Average particle size (μm) | Aspect ratio (—) | Geometrical standard deviation (—) | BET specific surface area ($m^2/g$) |
| Example 31 | 0.28 | — | 1.52 | 6.8 |
| Example 32 | 0.23 | — | 1.34 | 11.9 |
| Example 33 | 0.40 | 8.1:1 | 1.52 | 24.9 |
| Example 34 | 0.23 | — | 1.42 | 13.8 |
| Example 35 | 0.29 | — | 1.51 | 15.1 |
| Example 36 | 0.23 | — | 1.34 | 14.6 |
| Example 37 | 0.41 | 8.1:1 | 1.50 | 25.6 |
| Example 38 | 0.23 | — | 1.42 | 11.8 |
| Comparative Example 18 | 0.28 | — | 1.53 | 11.3 |
| Comparative Example 19 | 0.28 | — | 1.52 | 10.6 |
| Comparative Example 20 | 0.28 | — | 1.53 | 16.3 |

| Examples and Comparative Examples | Properties of black magnetic composite particles Magnetic properties | | |
|---|---|---|---|
| | Coercive force (Oe) | Saturation magnetization (10 kOe) (emu/g) | Residual magnetization (10 kOe) (emu/g) |
| Example 31 | 108 | 80.6 | 10.8 |
| Example 32 | 63 | 71.8 | 7.1 |
| Example 33 | 336 | 75.3 | 25.6 |
| Example 34 | 57 | 64.6 | 6.1 |
| Example 35 | 106 | 73.2 | 10.0 |
| Example 36 | 63 | 75.2 | 6.1 |

TABLE 13-continued

| Examples and Comparative Examples | Coercive force (Oe) | Saturation magnetization (10 kOe) (emu/g) | Residual magnetization (10 kOe) (emu/g) |
|---|---|---|---|
| Example 37 | 336 | 77.8 | 26.3 |
| Example 38 | 56 | 65.3 | 6.5 |
| Comparative Example 18 | 102 | 78.3 | 10.0 |
| Comparative Example 19 | 100 | 83.2 | 10.8 |
| Comparative Example 20 | 102 | 81.6 | 10.1 |

| Examples and Comparative Examples | Properties of black magnetic composite particles: Fluidity index (—) | Blackness (L* value) (—) | Carbon black desorption percentage (%) | Thickness of carbon black Coat (μm) |
|---|---|---|---|---|
| Example 31 | 52 | 17.1 | 8.3 | 0.0023 |
| Example 32 | 52 | 16.8 | 9.1 | 0.0022 |
| Example 33 | 53 | 17.5 | 6.3 | 0.0023 |
| Example 34 | 46 | 17.0 | 5.9 | 0.0024 |
| Example 35 | 48 | 17.3 | 4.8 | 0.0023 |
| Example 36 | 51 | 16.1 | 3.9 | 0.0024 |
| Example 37 | 50 | 16.0 | 3.8 | 0.0025 |
| Example 38 | 53 | 17.3 | 2.8 | 0.0025 |
| Comparative Example 18 | 38 | 21.0 | 61.3 | — |
| Comparative Example 19 | 37 | 20.6 | 27.3 | — |
| Comparative Example 20 | 38 | 20.5 | 45.9 | — |

TABLE 14

| Examples and Comparative Examples | Properties of black magnetic composite particles: Average particle size (μm) | Aspect ratio (—) | Geometrical standard deviation (—) | BET specific surface area ($m^2/g$) |
|---|---|---|---|---|
| Example 39 | 0.28 | — | 1.52 | 5.9 |
| Example 40 | 0.23 | — | 1.34 | 12.6 |
| Example 41 | 0.41 | 8.0:1 | 1.52 | 25.6 |
| Example 42 | 0.23 | — | 1.43 | 13.9 |
| Example 43 | 0.29 | — | 1.50 | 14.8 |
| Example 44 | 0.23 | — | 1.34 | 16.3 |
| Example 45 | 0.40 | 8.1:1 | 1.50 | 21.8 |
| Example 46 | 0.23 | — | 1.43 | 13.6 |
| Comparative Example 21 | 0.29 | — | 1.52 | 10.3 |
| Comparative Example 22 | 0.29 | — | 1.51 | 10.6 |
| Comparative Example 23 | 0.29 | — | 1.52 | 10.1 |

| Examples and Comparative Examples | Properties of black magnetic composite particles, Magnetic properties: Coercive force (Oe) | Saturation magnetization (10 kOe) (emu/g) | Residual magnetization (10 kOe) (emu/g) |
|---|---|---|---|
| Example 39 | 107 | 81.4 | 11.6 |
| Example 40 | 66 | 72.1 | 6.3 |
| Example 41 | 341 | 74.1 | 25.4 |
| Example 42 | 59 | 63.6 | 6.0 |
| Example 43 | 107 | 73.1 | 10.1 |
| Example 44 | 66 | 73.8 | 6.6 |
| Example 45 | 340 | 78.1 | 26.8 |
| Example 46 | 56 | 66.6 | 6.8 |
| Comparative Example 21 | 104 | 83.1 | 10.0 |
| Comparative Example 22 | 104 | 84.1 | 10.0 |
| Comparative Example 23 | 103 | 83.1 | 10.1 |

TABLE 14-continued

| Examples and Comparative Examples | Properties of black magnetic composite particles: Fluidity index (—) | Blackness (L* value) (—) | Carbon black desorption percentage (%) | Thickness of carbon black Coat (μm) |
|---|---|---|---|---|
| Example 39 | 52 | 16.0 | 7.1 | 0.0024 |
| Example 40 | 51 | 16.3 | 6.5 | 0.0022 |
| Example 41 | 53 | 17.2 | 5.9 | 0.0022 |
| Example 42 | 52 | 17.6 | 5.3 | 0.0024 |
| Example 43 | 54 | 16.0 | 4.3 | 0.0023 |
| Example 44 | 54 | 16.0 | 3.4 | 0.0025 |
| Example 45 | 52 | 17.4 | 3.8 | 0.0026 |
| Example 46 | 53 | 17.4 | 4.3 | 0.0025 |
| Comparative Example 21 | 37 | 20.8 | 69.2 | — |
| Comparative Example 22 | 37 | 21.0 | 31.6 | — |
| Comparative Example 23 | 38 | 20.6 | 50.8 | — |

TABLE 15

| Examples and Comparative Examples | Production of black magnetic toner: Black magnetic composite particles: Kind | Amount blended (part by weight) | Resin: Kind | Amount blended (part by weight) |
|---|---|---|---|---|
| Example 47 | Example 23 | 45 | Styrene-acryl copolymer resin | 55 |
| Example 48 | Example 24 | 45 | Styrene-acryl copolymer resin | 55 |
| Example 49 | Example 25 | 40 | Styrene-acryl copolymer resin | 60 |
| Example 50 | Example 26 | 50 | Styrene-acryl copolymer resin | 50 |
| Example 51 | Example 27 | 45 | Styrene-acryl copolymer resin | 55 |
| Example 52 | Example 28 | 40 | Styrene-acryl copolymer resin | 60 |
| Example 53 | Example 29 | 50 | Styrene-acryl copolymer resin | 50 |
| Example 54 | Example 30 | 50 | Styrene-acryl copolymer resin | 50 |
| Comparative Example 24 | Comparative Example 15 | 45 | Styrene-acryl copolymer resin | 55 |
| Comparative Example 25 | Comparative Example 16 | 45 | Styrene-acryl copolymer resin | 55 |
| Comparative Example 26 | Comparative Example 17 | 45 | Styrene-acryl copolymer resin | 55 |

TABLE 15-continued

| Examples and Comparative Examples | Properties of black magnetic toner: Average particle size (μm) | Dispersibility (–) | Fluidity index (–) | Volume resistivity (Ω · cm) |
|---|---|---|---|---|
| Example 47 | 9.9 | 5 | 75 | $8.9 \times 10^{13}$ |
| Example 48 | 10.0 | 5 | 81 | $1.8 \times 10^{14}$ |
| Example 49 | 10.6 | 4 | 75 | $7.6 \times 10^{13}$ |
| Example 50 | 10.5 | 5 | 78 | $7.1 \times 10^{13}$ |
| Example 51 | 9.6 | 5 | 79 | $5.9 \times 10^{13}$ |
| Example 52 | 9.9 | 5 | 83 | $3.1 \times 10^{14}$ |
| Example 53 | 10.0 | 5 | 76 | $1.9 \times 10^{14}$ |
| Example 54 | 10.8 | 5 | 83 | $1.5 \times 10^{14}$ |
| Comparative Example 24 | 10.6 | 2 | 56 | $1.8 \times 10^{12}$ |
| Comparative Example 25 | 10.5 | 2 | 58 | $2.1 \times 10^{12}$ |
| Comparative Example 26 | 10.4 | 2 | 56 | $2.1 \times 10^{12}$ |

| Examples and Comparative Examples | Properties of black magnetic toner, Magnetic properties: Coercive force (Oe) | Saturation magnetization (10 kOe) (emu/g) | Saturation magnetization (1 kOe) (emu/g) |
|---|---|---|---|
| Example 47 | 97 | 36.6 | 27.4 |
| Example 48 | 60 | 33.4 | 26.0 |
| Example 49 | 321 | 31.4 | 23.5 |
| Example 50 | 57 | 32.3 | 22.8 |
| Example 51 | 104 | 32.5 | 23.5 |
| Example 52 | 67 | 29.8 | 22.6 |
| Example 53 | 328 | 33.6 | 23.6 |
| Example 54 | 52 | 31.7 | 24.1 |
| Comparative Example 24 | 101 | 37.2 | 27.2 |
| Comparative Example 25 | 102 | 38.0 | 29.3 |
| Comparative Example 26 | 102 | 36.5 | 28.5 |

| Examples and Comparative Examples | Properties of black magnetic toner, Magnetic properties, Residual magnetization: (10 kOe) (emu/g) | Residual magnetization (1 kOe) (emu/g) | Blackness (L* value) (–) |
|---|---|---|---|
| Example 47 | 5.8 | 4.3 | 18.5 |
| Example 48 | 4.1 | 2.9 | 17.9 |
| Example 49 | 11.1 | 8.4 | 19.2 |
| Example 50 | 4.4 | 3.2 | 19.3 |
| Example 51 | 5.3 | 4.0 | 17.6 |
| Example 52 | 3.7 | 2.8 | 18.2 |
| Example 53 | 10.1 | 7.2 | 18.0 |
| Example 54 | 4.7 | 3.1 | 19.1 |
| Comparative Example 24 | 5.1 | 4.0 | 22.2 |
| Comparative Example 25 | 5.1 | 4.0 | 23.6 |
| Comparative Example 26 | 5.0 | 4.1 | 23.0 |

TABLE 16

| Examples and Comparative Examples | Production of black magnetic toner, Black magnetic composite particles: Kind | Amount blended (part by weight) | Resin: Kind | Amount blended (part by weight) |
|---|---|---|---|---|
| Example 55 | Example 31 | 45 | Styrene-acryl copolymer resin | 55 |
| Example 56 | Example 32 | 45 | Styrene-acryl copolymer resin | 55 |
| Example 57 | Example 33 | 40 | Styrene-acryl copolymer resin | 60 |
| Example 58 | Example 34 | 50 | Styrene-acryl copolymer resin | 50 |
| Example 59 | Example 35 | 45 | Styrene-acryl copolymer resin | 55 |
| Example 60 | Example 36 | 40 | Styrene-acryl copolymer resin | 60 |
| Example 61 | Example 37 | 50 | Styrene-acryl copolymer resin | 50 |
| Example 62 | Example 38 | 50 | Styrene-acryl copolymer resin | 50 |
| Comparative Example 27 | Comparative Example 18 | 45 | Styrene-acryl copolymer resin | 55 |
| Comparative Example 28 | Comparative Example 19 | 45 | Styrene-acryl copolymer resin | 55 |
| Comparative Example 29 | Comparative Example 20 | 45 | Styrene-acryl copolymer resin | 55 |

| Examples and Comparative Examples | Properties of black magnetic toner: Average particle size (μm) | Dispersibility (–) | Fluidity index (–) | Volume resistivity (Ω · cm) |
|---|---|---|---|---|
| Example 55 | 10.0 | 5 | 76 | $9.2 \times 10^{13}$ |
| Example 56 | 10.0 | 5 | 80 | $2.5 \times 10^{14}$ |
| Example 57 | 10.1 | 4 | 76 | $6.5 \times 10^{13}$ |
| Example 58 | 9.9 | 5 | 81 | $7.8 \times 10^{13}$ |
| Example 59 | 10.1 | 5 | 80 | $7.3 \times 10^{13}$ |
| Example 60 | 9.8 | 5 | 85 | $3.2 \times 10^{14}$ |
| Example 61 | 10.2 | 5 | 75 | $2.6 \times 10^{14}$ |
| Example 62 | 10.0 | 5 | 83 | $1.4 \times 10^{14}$ |
| Comparative Example 27 | 10.2 | 2 | 60 | $1.8 \times 10^{12}$ |
| Comparative Example 28 | 10.4 | 2 | 59 | $3.1 \times 10^{12}$ |
| Comparative Example 29 | 10.2 | 2 | 60 | $3.4 \times 10^{12}$ |

| Examples and Comparative Examples | Properties of black magnetic toner, Magnetic properties: Coercive force (Oe) | Saturation magnetization (10 kOe) (emu/g) | Saturation magnetization (1 kOe) (emu/g) |
|---|---|---|---|
| Example 55 | 96 | 36.5 | 27.4 |
| Example 56 | 61 | 33.8 | 26.5 |
| Example 57 | 321 | 34.4 | 23.2 |
| Example 58 | 58 | 32.6 | 22.4 |
| Example 59 | 102 | 32.0 | 23.4 |

TABLE 16-continued

| | | | |
|---|---|---|---|
| Example 60 | 66 | 29.4 | 22.1 |
| Example 61 | 318 | 33.4 | 25.6 |
| Example 62 | 51 | 31.6 | 23.4 |
| Comparative Example 27 | 101 | 38.2 | 27.8 |
| Comparative Example 28 | 102 | 38.2 | 29.3 |
| Comparative Example 29 | 100 | 36.7 | 28.5 |

| Examples and Comparative Examples | Properties of black magnetic toner: Magnetic properties, Residual magnetization (10 kOe) (emu/g) | (1 kOe) (emu/g) | Blackness (L* value) (–) |
|---|---|---|---|
| Example 55 | 5.8 | 4.3 | 18.4 |
| Example 56 | 4.1 | 2.8 | 17.9 |
| Example 57 | 11.4 | 8.6 | 19.3 |
| Example 58 | 4.5 | 3.3 | 18.8 |
| Example 59 | 5.3 | 4.1 | 17.2 |
| Example 60 | 3.7 | 2.8 | 17.9 |
| Example 61 | 8.6 | 6.4 | 18.3 |
| Example 62 | 4.3 | 3.1 | 18.6 |
| Comparative Example 27 | 5.9 | 4.6 | 23.3 |
| Comparative Example 28 | 5.3 | 4.1 | 22.8 |
| Comparative Example 29 | 5.0 | 3.9 | 22.2 |

TABLE 17

| | Production of black magnetic toner | | | |
|---|---|---|---|---|
| | Black magnetic composite particles | | Resin | |
| Examples and Comparative Examples | Kind | Amount blended (part by weight) | Kind | Amount blended (part by weight) |
| Example 63 | Example 39 | 45 | Styrene-acryl copolymer resin | 55 |
| Example 64 | Example 40 | 45 | Styrene-acryl copolymer resin | 55 |
| Example 65 | Example 41 | 40 | Styrene-acryl copolymer resin | 60 |
| Example 66 | Example 42 | 50 | Styrene-acryl copolymer resin | 50 |
| Example 67 | Example 43 | 45 | Styrene-acryl copolymer resin | 55 |
| Example 68 | Example 44 | 40 | Styrene-acryl copolymer resin | 60 |
| Example 69 | Example 45 | 50 | Styrene-acryl copolymer resin | 50 |
| Example 70 | Example 46 | 50 | Styrene-acryl copolymer resin | 50 |
| Comparative Example 30 | Comparative Example 21 | 45 | Styrene-acryl copolymer resin | 55 |
| Comparative Example 31 | Comparative Example 22 | 45 | Styrene-acryl copolymer resin | 55 |

TABLE 17-continued

| | | | | |
|---|---|---|---|---|
| Comparative Example 32 | Comparative Example 23 | 45 | Styrene-acryl copolymer resin | 55 |

| Examples and Comparative Examples | Properties of black magnetic toner: Average particle size (μm) | Dispersibility (–) | Fluidity index (–) | Volume resistivity (Ω · cm) |
|---|---|---|---|---|
| Example 63 | 10.1 | 5 | 75 | $8.6 \times 10^{13}$ |
| Example 64 | 9.8 | 5 | 78 | $2.1 \times 10^{14}$ |
| Example 65 | 10.2 | 4 | 72 | $6.5 \times 10^{13}$ |
| Example 66 | 9.9 | 5 | 80 | $7.3 \times 10^{13}$ |
| Example 67 | 10.3 | 5 | 80 | $7.1 \times 10^{13}$ |
| Example 68 | 10.0 | 5 | 82 | $3.2 \times 10^{14}$ |
| Example 69 | 9.6 | 5 | 79 | $1.6 \times 10^{14}$ |
| Example 70 | 10.0 | 5 | 83 | $2.1 \times 10^{14}$ |
| Comparative Example 30 | 9.8 | 2 | 59 | $1.2 \times 10^{12}$ |
| Comparative Example 31 | 9.9 | 2 | 57 | $1.4 \times 10^{12}$ |
| Comparative Example 32 | 10.0 | 2 | 57 | $3.2 \times 10^{12}$ |

| Examples and Comparative Examples | Properties of black magnetic toner, Magnetic properties: Coercive force (Oe) | Saturation magnetization (10 kOe) (emu/g) | (1 kOe) (emu/g) |
|---|---|---|---|
| Example 63 | 98 | 36.9 | 27.3 |
| Example 64 | 62 | 33.8 | 26.2 |
| Example 65 | 308 | 34.9 | 23.1 |
| Example 66 | 58 | 32.6 | 22.6 |
| Example 67 | 101 | 32.6 | 23.1 |
| Example 68 | 64 | 32.6 | 22.6 |
| Example 69 | 313 | 33.2 | 24.2 |
| Example 70 | 56 | 32.1 | 23.1 |
| Comparative Example 30 | 102 | 38.6 | 27.3 |
| Comparative Example 31 | 103 | 37.9 | 25.6 |
| Comparative Example 32 | 101 | 37.1 | 28.3 |

| Examples and Comparative Examples | Properties of black magnetic toner: Magnetic properties, Residual magnetization (10 kOe) (emu/g) | (1 kOe) (emu/g) | Blackness (L* value) (–) |
|---|---|---|---|
| Example 63 | 5.6 | 4.2 | 18.6 |
| Example 64 | 3.6 | 2.8 | 17.8 |
| Example 65 | 12.1 | 8.4 | 19.0 |
| Example 66 | 3.6 | 3.1 | 18.6 |
| Example 67 | 5.1 | 3.9 | 17.4 |
| Example 68 | 3.8 | 2.5 | 18.0 |
| Example 69 | 10.6 | 5.2 | 18.3 |
| Example 70 | 4.3 | 3.4 | 18.9 |
| Comparative Example 30 | 5.8 | 4.3 | 23.2 |
| Comparative Example 31 | 5.3 | 4.2 | 23.5 |
| Comparative Example 32 | 5.0 | 4.0 | 23.1 |

TABLE 18

| Examples and Comparative Examples | Kind of particles to be treated | Production of black magnetic composite particles Coating step with fluoroalkylsilane compound Fluoroalkylsilane compound Kind | Amount added (part by weight) |
|---|---|---|---|
| Example 71 | Core particles 1 | Tridecafluorooctyl trimethoxysilane | 2.0 |
| Example 72 | Core particles 2 | Heptadecafluorodecyl trimethoxysilane | 4.0 |
| Example 73 | Core particles 3 | Trifluoropropyl trimethoxysilane | 3.0 |
| Example 74 | Core particles 4 | Tridecafluorooctyl trimethoxysilane | 1.0 |
| Example 75 | Core particles 5 | Tridecafluorooctyl trimethoxysilane | 6.0 |
| Example 76 | Core particles 6 | Heptadecafluorodecyl trimethoxysilane | 4.0 |
| Example 77 | Core particles 7 | Trifluoropropyl trimethoxysilane | 0.5 |
| Example 78 | Core particles 8 | Tridecafluorooctyl trimethoxysilane | 1.5 |
| Comparative Example 33 | Core particles 1 | Tridecafluorooctyl trimethoxysilane | 2.0 |
| Comparative Example 34 | Core particles 1 | Tridecafluorooctyl trimethoxysilane | 3.0 |
| Comparative Example 35 | Core particles 1 | Tridecafluorooctyl trimethoxysilane | 0.005 |

| Examples and Comparative Examples | Production of black magnetic composite particles Coating step with fluoroalkylsilane compound Edge runner treatment Linear load (Kg/cm) | Time (min) | Coating amount (calculated as Si) (wt. %) |
|---|---|---|---|
| Example 71 | 60 | 30 | 0.13 |
| Example 72 | 45 | 25 | 0.20 |
| Example 73 | 30 | 40 | 0.47 |
| Example 74 | 75 | 45 | 0.07 |
| Example 75 | 60 | 30 | 0.39 |
| Example 76 | 60 | 20 | 0.21 |
| Example 77 | 30 | 45 | 0.08 |
| Example 78 | 30 | 60 | 0.10 |
| Comparative Example 33 | 60 | 30 | 0.13 |
| Comparative Example 34 | 60 | 30 | 0.21 |
| Comparative Example 35 | 60 | 30 | $3.0 \times 10^{-4}$ |

| Examples and Comparative Examples | Production of black magnetic composite particles Adhering step of carbon black Carbon black fine particles Kind | Amount added (part by weight) |
|---|---|---|
| Example 71 | A | 8.0 |
| Example 72 | A | 6.0 |
| Example 73 | B | 5.0 |
| Example 74 | C | 13.0 |
| Example 75 | A | 10.0 |
| Example 76 | A | 10.0 |
| Example 77 | B | 18.0 |
| Example 78 | C | 16.0 |
| Comparative Example 33 | — | — |
| Comparative Example 34 | A | 0.01 |
| Comparative Example 35 | B | 5.0 |

TABLE 18-continued

| Examples and Comparative Examples | Production of black magnetic composite particles Adhering step of carbon black Edge runner treatment Linear load (Kg/cm) | Time (min) | Amount adhered (calculated as C) (wt. %) |
|---|---|---|---|
| Example 71 | 60 | 30 | 7.41 |
| Example 72 | 30 | 45 | 5.69 |
| Example 73 | 60 | 30 | 4.79 |
| Example 74 | 30 | 45 | 11.53 |
| Example 75 | 60 | 25 | 9.00 |
| Example 76 | 30 | 60 | 9.10 |
| Example 77 | 60 | 45 | 15.17 |
| Example 78 | 30 | 45 | 13.82 |
| Comparative Example 33 | — | — | — |
| Comparative Example 34 | 60 | 30 | 0.01 |
| Comparative Example 35 | 60 | 30 | 4.75 |

TABLE 19

| Examples and Comparative Examples | Properties of black magnetic composite particles Average particle size (μm) | Aspect ratio (—) | Geometrical standard deviation (—) | BET specific surface area ($m^2/g$) |
|---|---|---|---|---|
| Example 71 | 0.29 | — | 1.53 | 6.3 |
| Example 72 | 0.23 | — | 1.33 | 12.8 |
| Example 73 | 0.40 | 8.1:1 | 1.52 | 26.8 |
| Example 74 | 0.23 | — | 1.43 | 14.6 |
| Example 75 | 0.29 | — | 1.53 | 15.3 |
| Example 76 | 0.23 | — | 1.33 | 14.8 |
| Example 77 | 0.40 | 8.1:1 | 1.51 | 28.8 |
| Example 78 | 0.23 | — | 1.43 | 13.4 |
| Comparative Example 33 | 0.28 | — | 1.52 | 10.0 |
| Comparative Example 34 | 0.29 | — | 1.52 | 9.8 |
| Comparative Example 35 | 0.29 | — | 1.52 | 13.6 |

| Examples and Comparative Examples | Properties of black magnetic composite particles Magnetic properties Coercive force (Oe) | Saturation magnetization (10 kOe) (emu/g) | Residual magnetization (10 kOe) (emu/g) |
|---|---|---|---|
| Example 71 | 108 | 81.5 | 11.7 |
| Example 72 | 68 | 72.4 | 6.5 |
| Example 73 | 343 | 74.6 | 25.3 |
| Example 74 | 58 | 64.3 | 6.1 |
| Example 75 | 107 | 73.2 | 10.0 |
| Example 76 | 67 | 73.6 | 6.5 |
| Example 77 | 340 | 78.1 | 26.3 |
| Example 78 | 57 | 63.2 | 6.5 |
| Comparative Example 33 | 103 | 83.3 | 9.9 |
| Comparative Example 34 | 103 | 84.1 | 9.8 |
| Comparative Example 35 | 103 | 83.3 | 10.2 |

TABLE 19-continued

| Examples and Comparative Examples | Properties of black magnetic composite particles: Fluidity index (—) | Blackness (L* value) (—) | Carbon black desorption percentage (%) | Thickness of carbon black Coat (μm) |
|---|---|---|---|---|
| Example 71 | 47 | 16.4 | 6.1 | 0.0024 |
| Example 72 | 48 | 16.8 | 7.4 | 0.0022 |
| Example 73 | 50 | 17.3 | 8.2 | 0.0023 |
| Example 74 | 46 | 17.8 | 5.6 | 0.0024 |
| Example 75 | 51 | 16.5 | 4.3 | 0.0023 |
| Example 76 | 52 | 16.3 | 4.1 | 0.0025 |
| Example 77 | 53 | 17.6 | 3.8 | 0.0026 |
| Example 78 | 52 | 17.8 | 4.8 | 0.0025 |
| Comparative Example 33 | 38 | 20.6 | 79.1 | — |
| Comparative Example 34 | 38 | 20.8 | 28.7 | — |
| Comparative Example 35 | 37 | 20.3 | 53.4 | — |

TABLE 20

| Examples and Comparative Examples | Production of black magnetic toner: Black magnetic particles: Kind | Black magnetic particles: Amount blended (part by weight) | Resin: Kind | Resin: Amount blended (part by weight) |
|---|---|---|---|---|
| Example 79 | Example 71 | 45 | Styrene-acryl copolymer resin | 55 |
| Example 80 | Example 72 | 45 | Styrene-acryl copolymer resin | 55 |
| Example 81 | Example 73 | 40 | Styrene-acryl copolymer resin | 60 |
| Example 82 | Example 74 | 50 | Styrene-acryl copolymer resin | 50 |
| Example 83 | Example 75 | 45 | Styrene-acryl copolymer resin | 55 |
| Example 84 | Example 76 | 40 | Styrene-acryl copolymer resin | 60 |
| Example 85 | Example 77 | 50 | Styrene-acryl copolymer resin | 50 |
| Example 86 | Example 78 | 50 | Styrene-acryl copolymer resin | 50 |
| Comparative Example 36 | Comparative Example 33 | 45 | Styrene-acryl copolymer resin | 55 |
| Comparative Example 37 | Comparative Example 34 | 45 | Styrene-acryl copolymer resin | 55 |
| Comparative Example 38 | Comparative Example 35 | 45 | Styrene-acryl copolymer resin | 55 |

TABLE 20-continued

| Examples and Comparative Examples | Properties of black magnetic toner: Average particle size (μm) | Dispersibility (—) | Fluidity index (—) | Volume resistivity (Ω · cm) |
|---|---|---|---|---|
| Example 79 | 10.0 | 5 | 76 | $8.1 \times 10^{13}$ |
| Example 80 | 9.8 | 4 | 81 | $2.1 \times 10^{14}$ |
| Example 81 | 10.1 | 4 | 73 | $6.5 \times 10^{13}$ |
| Example 82 | 10.3 | 5 | 82 | $9.2 \times 10^{13}$ |
| Example 83 | 10.2 | 5 | 85 | $5.4 \times 10^{13}$ |
| Example 84 | 10.0 | 5 | 86 | $3.6 \times 10^{14}$ |
| Example 85 | 9.9 | 5 | 83 | $2.6 \times 10^{14}$ |
| Example 86 | 9.8 | 5 | 84 | $3.8 \times 10^{14}$ |
| Comparative Example 36 | 10.1 | 2 | 57 | $1.3 \times 10^{12}$ |
| Comparative Example 37 | 10.3 | 2 | 56 | $2.4 \times 10^{12}$ |
| Comparative Example 38 | 10.1 | 2 | 56 | $6.8 \times 10^{12}$ |

| Examples and Comparative Examples | Properties of black magnetic toner Magnetic properties: Coercive force (Oe) | Saturation magnetization (10 kOe) (emu/g) | Saturation magnetization (1 kOe) (emu/g) |
|---|---|---|---|
| Example 79 | 100 | 36.9 | 27.0 |
| Example 80 | 63 | 34.8 | 26.4 |
| Example 81 | 315 | 34.3 | 22.9 |
| Example 82 | 58 | 31.6 | 22.6 |
| Example 83 | 101 | 32.1 | 23.3 |
| Example 84 | 61 | 32.8 | 22.2 |
| Example 85 | 313 | 32.6 | 24.1 |
| Example 86 | 55 | 32.1 | 23.0 |
| Comparative Example 36 | 101 | 38.4 | 27.3 |
| Comparative Example 37 | 100 | 38.0 | 25.3 |
| Comparative Example 38 | 101 | 37.1 | 27.2 |

| Examples and Comparative Examples | Properties of black magnetic toner: Magnetic properties Residual magnetization (10 kOe) (emu/g) | Residual magnetization (1 kOe) (emu/g) | Blackness (L* value) (—) |
|---|---|---|---|
| Example 79 | 5.7 | 4.1 | 18.5 |
| Example 80 | 3.7 | 2.8 | 17.6 |
| Example 81 | 12.3 | 8.3 | 18.8 |
| Example 82 | 3.8 | 3.0 | 18.6 |
| Example 83 | 5.6 | 3.4 | 17.2 |
| Example 84 | 3.6 | 2.1 | 18.3 |
| Example 85 | 9.8 | 5.3 | 17.3 |
| Example 86 | 3.7 | 3.2 | 17.3 |
| Comparative Example 36 | 5.4 | 4.3 | 23.4 |
| Comparative Example 37 | 5.3 | 4.5 | 23.2 |
| Comparative Example 38 | 5.0 | 4.0 | 22.2 |

What is claimed is:

1. Black magnetic composite particles for a black magnetic toner, comprising:

maghemite particles having an average particle diameter of 0.055 to 0.95 μm;

a coating layer formed on the surface of said maghemite particles, comprising at least one organosilicon compound selected from the group consisting of:

(1) organosilane compounds obtainable from alkoxysilane compounds, (2) polysiloxanes or modified polysiloxanes, and (3) fluoroalkyl organosilane compounds obtainable from fluoroalkylsilane compounds; and a carbon black coat formed on said coating layer comprising said organosilicon compound, in an amount of 1 to 25 parts by weight based on 100 parts by weight of said maghemite particles.

2. Black magnetic composite particles according to claim 1, wherein said maghemite particles are particles having a coat which is formed on at least a part of the surface of said maghemite particles and which comprises at least one compound selected from the group consisting of hydroxides of aluminum, oxides of aluminum, hydroxides of silicon and oxides of silicon in an amount of 0.01 to 50% by weight, calculated as Al or $SiO_2$, based on the total weight of the maghemite particles.

3. Black magnetic composite particles according to claim 1, wherein said modified polysiloxanes are selected from the group consisting of:

(A) polysiloxanes modified with at least one compound selected from the group consisting of polyethers, polyesters and epoxy compounds, and (B) polysiloxanes whose molecular terminal is modified with at least one group selected from the group consisting of carboxylic acid groups, alcohol groups and a hydroxyl group.

4. Black magnetic composite particles according to claim 3, wherein said polysiloxanes modified with at least one compound selected from the group consisting of polyethers, polyesters and epoxy compounds are represented by the general formula (III), (IV) or (V):

(III)

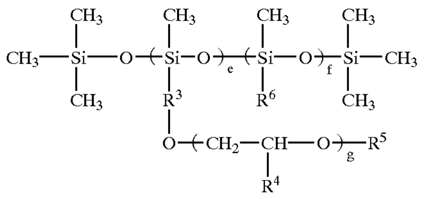

wherein $R^3$ is $-(-CH_2-)_h-$; $R^4$ is $-(-CH_2-)_i-CH_3$; $R^5$ is $-OH$, $-COOH$, $-CH{=}CH_2$, $-C(CH_3){=}CH_2$ or $-(-CH_2-)_j-CH_3$; $R^6$ is $-(-CH_2-)_k-CH_3$; g and h are each integers of 1 to 15; i, j and k are each integers of 0 to 15; e is an integer of 1 to 50; and f is an integer of 1 to 300;

(IV)

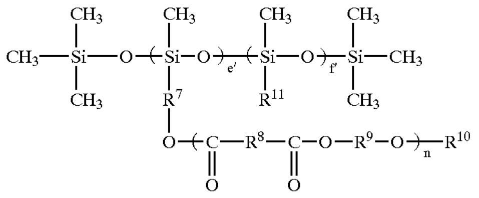

wherein $R^7$, $R^8$ and $R^9$ are $-(-CH_2-)_q-$ which may be the same or different; $R^{10}$ is $-OH$, $-COOH$, $-CH{=}CH_2$, $-C(CH_3){=}CH_2$ or $-(-CH_2-)_r-CH^3$; $R^{11}$ is $-(-CH_2-)_s-CH_3$; n and q are each integers of 1 to 15; r and s are each integers of 0 to 15; e' is an integer of 1 to 50; and f' is an integer of 1 to 300; or (V)

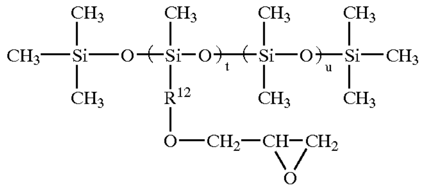

wherein $R^{12}$ is $-(-CH_2-)_v-$; v is an integer of 1 to 15; t is an integer of 1 to 50; and u is an integer of 1 to 300.

5. Black magnetic composite particles according to claim 3, wherein said polysiloxanes whose molecular terminal is modified with at least one group selected from the group consisting of carboxylic acid groups, alcohol groups and a hydroxyl group are represented by the general formula (VI):

(VI)

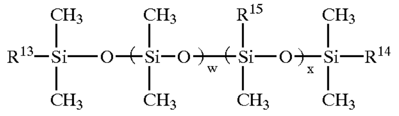

wherein $R^{13}$ and $R^{14}$ are $-OH$, $R^{16}OH$ or $R^{17}COOH$ which may be the same or different; $R^{15}$ is $-CH_3$ or $-C_6H_5$; $R^{16}$ and $R^{17}$ are $-(-CH_2-)_y-$; y is an integer of 1 to 15; w is an integer of 1 to 200; and x is an integer of 0 to 100.

6. Black magnetic composite particles according to claim 1, wherein said alkoxysilane compound is represented by the general formula (I):

$$R^1_aSiX_{4-a} \quad (I)$$

wherein $R^1$ is $C_6H_5-$, $(CH_3)_2CHCH_2-$ or $n\text{-}C_bH_{2b+1}-$ wherein b is an integer of 1 to 18; X is $CH_3O-$ or $C_2H_5O-$; and a is an integer of 0 to 3.

7. Black magnetic composite particles according to claim 6, wherein said alkoxysilane compound is methyl triethoxysilane, dimethyl diethoxysilane, phenyl triethoxysilane, diphenyldiethoxysilane, methyltrimethoxysilane, dimethyldimethoxysilane, phenyltrimethoxysilane, diphenyldiethoxysilane, isobutyltrimethoxysilane or decyltrimethoxysilane.

8. Black magnetic composite particles according to claim 1, wherein said polysiloxanes are represented by the general formula (II):

(II)

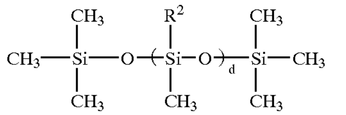

wherein $R^2$ is H— or $CH_3-$, and d is an integer of 15 to 450.

9. Black magnetic composite particles according to claim 8, wherein said polysiloxanes are ones having methyl hydrogen siloxane units.

10. Black magnetic composite particles according to claim 1, wherein said fluoroalkylsilane compounds are represented by the general formula (VII):

$$CF_3(CF_2)_zCH_2CH_2(R^{18})_{a'}SiX_{4-a'} \quad (VII)$$

wherein $R^{18}$ is $CH_3-$, $C_2H_5-$, $CH_3O-$ or $C_2H_5O-$; X is $CH_3O-$ or $C_2H_5O-$; and z is an integer of 0 to 15; and a' is an integer of 0 to 3.

11. Black magnetic composite particles according to claim 1, wherein the amount of said coating organosilicon compounds is 0.02 to 5.0% by weight, calculated as Si, based on the total weight of the organosilicon compounds and said magnetic iron oxide particles.

12. Black magnetic composite particles according to claim 1, wherein said carbon black coat is obtained by mixing carbon black fine particles having a particle size of 0.002 to 0.05 μm with the magnetic iron oxide particles coated with at least one organosilicon compound while applying a shear force.

13. Black magnetic composite particles according to claim 1, wherein the thickness of said carbon black coat is not more than 0.04 μm.

14. Black magnetic composite particles according to claim 1, wherein said black magnetic composite particles have an average particle diameter of 0.06 to 1.0 μm.

15. Black magnetic composite particles according to claim 1, wherein said black magnetic composite particles have a geometrical standard deviation of particle sizes of 1.01 to 2.0.

16. Black magnetic composite particles according to claim 1, wherein said black magnetic composite particles have a BET specific surface area value of 1 to 200 $m^2/g$, a flowability index of 45 to 80 and a blackness (L* value) of 15 to 20.

* * * * *